United States Patent
Green et al.

(10) Patent No.: US 12,272,970 B2
(45) Date of Patent: Apr. 8, 2025

(54) OPERATING FREQUENCY BASED POWER LEVEL ALTERING IN EXTENDED RANGE WIRELESS POWER TRANSMITTERS

(71) Applicant: NuCurrent, Inc., Chicago, IL (US)

(72) Inventors: Jason Green, Evanston, IL (US);
Andrew Kovacs, Lafayette, IN (US);
Mark Melone, Frankfort, IL (US); Md Nazmul Alam, Glendale Heights, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 18/953,887

(22) Filed: Nov. 20, 2024

(65) Prior Publication Data

US 2025/0079911 A1    Mar. 6, 2025

Related U.S. Application Data

(63) Continuation of application No. 18/826,756, filed on Sep. 6, 2024, which is a continuation of application
(Continued)

(51) Int. Cl.
*H02J 50/80* (2016.01)
*H01F 27/24* (2006.01)
(Continued)

(52) U.S. Cl.
CPC .............. *H02J 50/80* (2016.02); *H01F 27/24* (2013.01); *H01F 27/28* (2013.01); *H01F 27/36* (2013.01);
(Continued)

(58) Field of Classification Search
CPC .. H02J 50/80; H02J 50/12; H02J 50/70; H02J 50/50; H02J 50/10; H02J 5/005;
(Continued)

(56) References Cited

U.S. PATENT DOCUMENTS

| 6,075,433 A | 6/2000 | Ono et al. |
| 6,941,480 B1 | 9/2005 | Dai |

(Continued)

FOREIGN PATENT DOCUMENTS

| CN | 111092493 A | 5/2020 |
| JP | 2012228099 A | 11/2012 |

(Continued)

OTHER PUBLICATIONS

Brownout Definition & Meeting, Merriam-Webster [online], [retrieved Jul. 16, 2022], Retrieved from the internet: http://www.merriam-webster.com/dictionary/brownout, 3 Pages.

(Continued)

*Primary Examiner* — Lincoln D Donovan
*Assistant Examiner* — Alex W Lam
(74) *Attorney, Agent, or Firm* — Lee Sullivan Shea & Smith LLP

(57) ABSTRACT

A wireless power transmitter is configured to (i) send, to an external power supply, a request that the external power supply change a configurable voltage level of a supply voltage signal for the wireless power transmitter from a first voltage level to a second voltage level, (ii) after detecting that the external power supply has changed the configurable voltage level of the supply voltage signal from the first voltage level to the second voltage level, causing a configurable frequency of a drive signal for the wireless power transmitter to be changed from a first frequency to a second frequency, (iii) produce a wireless power signal for receipt by a wireless power receiver in accordance with an alternating current signal that (a) has the second frequency and the supply voltage signal having the second voltage level and (b) is produced by a power conditioning system of the wireless power transmitter.

30 Claims, 17 Drawing Sheets

Related U.S. Application Data

No. 18/464,749, filed on Sep. 11, 2023, now Pat. No. 12,088,124, which is a continuation of application No. 17/588,531, filed on Jan. 31, 2022, now Pat. No. 11,757,313, which is a continuation of application No. 16/863,682, filed on Apr. 30, 2020, now Pat. No. 11,239,709.

(51) Int. Cl.
| | | |
|---|---|---|
| *H01F 27/28* | (2006.01) | |
| *H01F 27/36* | (2006.01) | |
| *H01F 38/14* | (2006.01) | |
| *H02J 50/12* | (2016.01) | |
| *H02J 50/50* | (2016.01) | |
| *H02J 50/70* | (2016.01) | |

(52) U.S. Cl.
CPC .............. *H01F 38/14* (2013.01); *H02J 50/12* (2016.02); *H02J 50/50* (2016.02); *H02J 50/70* (2016.02)

(58) Field of Classification Search
CPC .. H02J 50/20; H02J 7/025; H02J 7/007; H02J 7/00034; H02J 7/00045; H02J 7/0042; H02J 7/0027; H02J 7/2434; H02J 50/60; H02J 50/90; H02J 50/40; H02J 50/402; H01F 38/14; H01F 27/24; H01F 27/36; H01F 27/28; H01F 2007/1888
See application file for complete search history.

(56) References Cited

U.S. PATENT DOCUMENTS

| | | | |
|---|---|---|---|
| 7,960,944 | B2 | 6/2011 | Hoffman et al. |
| 9,912,187 | B2 | 3/2018 | Sultenfuss et al. |
| 10,410,789 | B2 | 9/2019 | Kurs |
| 10,978,921 | B1 | 4/2021 | Wang et al. |
| 11,637,648 | B2 | 4/2023 | Kim et al. |
| 2004/0261422 | A1 | 12/2004 | McEuen et al. |
| 2005/0068019 | A1 | 3/2005 | Nakamura et al. |
| 2005/0288743 | A1 | 12/2005 | Ahn et al. |
| 2006/0209487 | A1 | 9/2006 | Schmidt et al. |
| 2011/0018498 | A1 | 1/2011 | Soar |
| 2011/0062793 | A1 | 3/2011 | Azancot et al. |
| 2011/0090726 | A1 | 4/2011 | Brotto et al. |
| 2012/0175967 | A1 | 7/2012 | Dibben et al. |
| 2012/0217111 | A1 | 8/2012 | Boys et al. |
| 2012/0286726 | A1 | 11/2012 | Kim et al. |
| 2013/0058380 | A1* | 3/2013 | Kim ...................... H04W 76/14 455/434 |
| 2013/0069586 | A1 | 3/2013 | Jung et al. |
| 2013/0082536 | A1 | 4/2013 | Taylor et al. |
| 2013/0127580 | A1 | 5/2013 | Dobbs |
| 2013/0162201 | A1 | 6/2013 | Yeh |
| 2013/0169062 | A1 | 7/2013 | Maikawa et al. |
| 2013/0307468 | A1 | 11/2013 | Lee et al. |
| 2014/0002015 | A1 | 1/2014 | Tripathi et al. |
| 2014/0239732 | A1* | 8/2014 | Mach ...................... H02H 3/38 307/104 |
| 2014/0354223 | A1 | 12/2014 | Lee et al. |
| 2015/0091389 | A1 | 4/2015 | Byrne et al. |
| 2015/0115880 | A1 | 4/2015 | Soar |
| 2015/0214752 | A1 | 7/2015 | Gluzman et al. |
| 2015/0222129 | A1 | 8/2015 | McCauley et al. |
| 2015/0270740 | A1 | 9/2015 | Lee et al. |
| 2015/0270776 | A1 | 9/2015 | Mallik et al. |
| 2015/0333532 | A1 | 11/2015 | Han et al. |
| 2016/0006289 | A1* | 1/2016 | Sever ...................... H02J 50/80 320/108 |
| 2016/0043590 | A1 | 2/2016 | Ha et al. |
| 2016/0118179 | A1 | 4/2016 | Park et al. |
| 2016/0181821 | A1 | 6/2016 | Xu et al. |
| 2017/0090531 | A1 | 3/2017 | Forbes et al. |
| 2017/0117752 | A1* | 4/2017 | Kaechi ................... H02J 50/60 |
| 2017/0129344 | A1 | 5/2017 | Islinger et al. |
| 2017/0133887 | A1 | 5/2017 | Tominaga et al. |
| 2017/0194092 | A1 | 7/2017 | Vix |
| 2017/0245679 | A1 | 8/2017 | Watts |
| 2017/0287626 | A1 | 10/2017 | Larson et al. |
| 2017/0288465 | A1 | 10/2017 | Sugasawa et al. |
| 2017/0331335 | A1 | 11/2017 | Brooks et al. |
| 2017/0358950 | A1 | 12/2017 | Zeine et al. |
| 2017/0368945 | A1 | 12/2017 | Park et al. |
| 2018/0152048 | A1 | 5/2018 | Mahmodieh et al. |
| 2018/0204674 | A1 | 7/2018 | Cho et al. |
| 2018/0205257 | A1 | 7/2018 | Kwon et al. |
| 2018/0277926 | A1 | 9/2018 | Park et al. |
| 2019/0267845 | A1 | 8/2019 | Maniktala |
| 2019/0384603 | A1 | 12/2019 | Kim et al. |
| 2019/0394906 | A1 | 12/2019 | Smith et al. |
| 2020/0094700 | A1 | 3/2020 | Hui |
| 2020/0177028 | A1 | 6/2020 | Esteban et al. |
| 2020/0235612 | A1 | 7/2020 | Muratov |
| 2020/0373072 | A1 | 11/2020 | Leem |
| 2021/0075255 | A1 | 3/2021 | Nutting et al. |
| 2021/0159736 | A1 | 5/2021 | Miyamoto et al. |
| 2021/0296999 | A1 | 9/2021 | Taleb et al. |
| 2021/0354577 | A1 | 11/2021 | Books et al. |

FOREIGN PATENT DOCUMENTS

| | | |
|---|---|---|
| KR | 101213090 B1 | 12/2012 |
| KR | 20190087733 A | 7/2019 |
| KR | 20200113098 A | 10/2020 |
| WO | 2014092339 A1 | 6/2014 |
| WO | 2015064815 A1 | 5/2015 |
| WO | 2019148070 A2 | 8/2019 |

OTHER PUBLICATIONS

International Searching Authority, PCT International Search Report and Written Opinion, PCT International Application No. PCTUS2021030315, Aug. 20, 2021, 11 pages.
International Searching Authority, PCT International Search Report and Written Opinion, PCT International Application No. PCT/US2021/064964 dated Apr. 28, 2022, 14 pages.
International Searching Authority, PCT International Search Report and Written Opinion, PCT International Application No. PCT/US2022/014409 dated May 16, 2022, 8 pages.
International Searching Authority, PCT International Search Report and Written Opinion, PCT International Application No. PCT/US2022/025650 dated Aug. 9, 2022, 11 pages.
QI Specification: MPP System Specification & MPP Communications Protocol, Wireless Power Consortium [online], Version 2.0, Apr. 2023, [retrieved Jan. 22, 2025], Retrieved from the Internet: URL: https://www.wirelesspowerconsortium.com/knowledge-base/specifications/download-the-qi-specifications, 268 pages.
QI Specification: Wireless Power Consortium [online], Version 1.3, Jan. 2021, [retrieved May 21, 2024], Retrieved from the Internet: URL: https://www.wirelesspowerconsortium.com/knowledge-base/specifications/download-the-qi-specifications, 746 pages.
QI Specification: Wireless Power Consortium [online], Version 2.0, Apr. 2023, [retrieved Jan. 22, 2025], Retrieved from the Internet: URL: https://www.wirelesspowerconsortium.com/knowledge-base/specifications/download-the-qi-specifications, 664 pages.

* cited by examiner

OPERATING FREQUENCY BASED POWER LEVEL ALTERING IN EXTENDED RANGE WIRELESS POWER TRANSMITTERS

CROSS-REFERENCE TO RELATED APPLICATIONS

This application is a continuation of, and claims priority to, U.S. Non-Provisional application Ser. No. 18/826,756, filed on Sep. 6, 2024, and entitled "OPERATING FREQUENCY BASED POWER LEVEL ALTERING IN EXTENDED RANGE WIRELESS POWER TRANSMITTERS," which is a continuation of, and claims priority to, U.S. Non-Provisional application Ser. No. 18/464,749, filed on Sep. 11, 2023, and entitled "OPERATING FREQUENCY BASED POWER LEVEL ALTERING IN EXTENDED RANGE WIRELESS POWER TRANSMITTERS," which is a continuation of, and claims priority to, U.S. Non-Provisional application Ser. No. 17/588,531, filed on Jan. 31, 2022, and entitled "OPERATING FREQUENCY BASED POWER LEVEL ALTERING IN EXTENDED RANGE WIRELESS POWER TRANSMITTERS," which is a continuation of, and claims priority to, U.S. Non-Provisional application Ser. No. 16/863,682, filed on Apr. 30, 2020, and entitled "OPERATING FREQUENCY BASED POWER LEVEL ALTERING IN EXTENDED RANGE WIRELESS POWER TRANSMITTERS," each of which is incorporated herein by reference in its entirety.

TECHNICAL FIELD

The present disclosure generally relates to systems and methods for wireless transfer of electrical power and, more particularly, to frequency-based control in granular power level alterations in wireless power transmitters, transmitting at extended separation distances.

BACKGROUND

Wireless power transfer systems are used in a variety of applications for the wireless transfer of electrical energy, electrical power signals, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Because some wireless power transfer systems are operable and/or most efficient in the near-field, some transmitters may be limited to having operability only at restrictively small gaps between the transmitter coil and the receiver coil. To that end, typical wireless power transmitters under the Wireless Power Consortium's Qi™ standard may be limited to operability at a maximum coil-to-coil separation gap (which may be referred to herein as a "separation gap" or "gap") of about 3 millimeters (mm) to about 5 mm. The separation gap is sometimes known as the Z-height or Z-distance and is generally measured as the distance between the transmitter coil and receiver coil.

As the adoption of wireless power grows, commercial applications are requiring a power transmitter capable of transferring power to a power receiver with a gap greater than 3-5 mm. By way of example, cabinets and/or counter tops may be more than 3-5 mm thick and as a result, prevent wireless charging through such furniture. As another example, modern mobile devices may be used with cases, grip devices, and/or wallets, among other things, that can obstruct wireless power transmission to the mobile device and/or create a separation gap that disallows operability of wireless power transmission. Legacy wireless power transmitter designs further may be incapable of desired commercial applications (e.g., through object chargers, under table chargers, infrastructure chargers, ruggedized computing device charging, among other things), due to the limitations in separation gap inherent to legacy, near-field wireless power transfer systems. Increasing the separation gap, while keeping satisfactory performance (e.g., thermal performance, transfer/charging speed, efficiency, etc.) will increase the number of commercial applications that can utilize wireless power.

Further, current standards specifications, regulations, and/or end-user product specifications may require particular power levels, for transmission to a power receiver. To that end, the power receiver may have particular power requests and/or particular limits for efficiency, safety, and/or any other power control reasons.

SUMMARY

New wireless power transmitters and/or associated base stations are desired that are capable of delivering wireless power signals to a power receiver at a separation gap larger than the about 3 mm to about 5 mm separation gaps of legacy transmitters. Further, wireless power transmitters at such larger gap distances may require and/or may be enhanced via more granular power controls.

In an embodiment, the overall structure of the transmitter is configured in a way that allows the transmitter to transfer power at an operating frequency of about 87 kilohertz (kHz) to about 205 kHz and achieve the same and/or enhanced relative characteristics (e.g., rate of power transfer, speed of power transfer, power level, power level management, among other things) of power transfer as legacy transmitters that operated in that frequency range. As a result, the separation gap may be increased from about 3-5 mm to around 15 mm or greater using the overall structure of the transmitter. In an embodiment, a transmitter may be configured with a ferrite core that substantially surrounds the transmitter antenna on three sides. The only place that the ferrite core does not surround the transmitter antenna is on the top (e.g., in the direction of power transfer) and where the power lines connect to the transmitter antenna. This overall structure of the transmitter allows for the combination of power transfer characteristics, power level characteristics, self-resonant frequency restraints, design requirements, adherence to standards bodies' required characteristics, bill of materials (BOM) and/or form factor constraints, among other things, that allow for power transfer over larger separation gaps.

Transmission of one or more of electrical energy, electrical power, electromagnetic energy or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

In some examples disclosed herein, data either determined by a method or process or stored in a database, may be utilized to relate power output levels, via an operating point, with specific operating frequencies, within an operating frequency range of operation for the power transmitter. To that end, due to the differing power characteristics at different operating points, granular control of power, voltage, and/or current levels may be achieved by dynamically altering the operating frequency, within the operating frequency range, to achieve a desired power level for output to the power receiver.

In some examples, power profiles, such as those defined by the Qi Standard, may require more sophisticated and/or granular controls, compared to legacy wireless power transmitters. Such examples may involve higher power input to the wireless power transmitter and, thus, more expensive and/or complicated voltage regulation mechanisms may be required in the power conditioning system and/or amplifier design. To that end, utilizing the systems and methods disclosed herein, such voltage regulation mechanisms may be removed from the wireless power transmitter and the wireless power transmitter may utilize control schemes, disclosed herein, to control the input power to the wireless power transmitter, via communications with an external input power source. By utilizing communications with the external power source, bill of materials (BOM) may be decreased, for such power transmitters, resulting in lower cost power transmitters. Additionally or alternatively, by utilizing such control schemes, the power transmitters utilizing said schemes, disclosed herein, may have greater compatibility and/or performance when utilized with off-the-shelf power supplies (e.g., Universal Serial Bus (USB) power supplies, Lightning power supplies, Qualcomm Quick Charge devices, USB-C power supplies, USB-PD (USB Power Delivery) power supplies, Mini-USB power supplies, proprietary power supplies, input/outputs on electronic devices (e.g., a computer, a multi device charger, an automobile console, a mobile device, a portable power supply, a battery, a generator, among other things).

In accordance with one aspect of the disclosure, a power transmitter for wireless power transfer at an operating frequency selected from an operating frequency range, the operating frequency range being about 87 kilohertz (kHz) to about 205 kHz is disclosed. The power transmitter includes a control and communications unit configured to provide power control signals to control a power level of a power signal configured for transmission to a power receiver and including a pulse width modulation (PWM) signal generator for determining and selecting the operating frequency from the operating frequency range. The power transmitter further includes an inverter circuit configured to receive a direct current (DC) power and convert the input power to a power signal, coil configured to transmit the power signal to a power receiver, the coil formed of wound Litz wire and including at least one layer, the coil defining, at least, a top face, and a shielding comprising a ferrite core and defining a cavity, the cavity configured such that the ferrite core substantially surrounds all but the top face of the coil.

In a refinement, the control and communications unit is further configured to receive power request signals from the power receiver and determine the power control signals based on the power request signals.

In a refinement, the control and communications unit is configured to provide the power control signals to a power supply external to the power transmitter and the power supply is configured to configure an input DC power to generate the DC power supplied based on the power control signals and provide the DC power the inverter circuit.

In a further refinement, the power supply includes a voltage regulator and a power supply controller configured to receive the power control signals, generate voltage regulation instructions for altering a DC voltage of the DC power, based on the power control signals, and provide the voltage regulation instructions to the voltage regulator to control the DC voltage of the DC power.

In a further refinement, the control and communications circuit is configured to generate frequency shift signals for the power input signals, the frequency shift signals provided to the PWM signal generator and configured to alter a power level of the power signal of the inverter circuit by shifting the operating frequency, within the operating frequency range.

In another further refinement, the voltage regulation instructions include selecting a base DC voltage for assignment as the DC voltage of the DC power and the power supply is configured to configure the DC power having a base DC voltage for the DC voltage, wherein the base voltage is selected from one or more preset DC power voltage levels.

In yet a further refinement, the preset DC power voltages include or more of 5 Volts (V), 9 V, 15 V, or 20 V.

In another further refinement, the one or more base voltage levels includes a first base voltage level and a second base voltage level, the first base voltage level is electrically associated with a first base power level and the second base voltage level is electrically associated with a second base power level, and the frequency shift is determined such that a AC output power level for the power signal is greater than the first base power level and less than the second base power level.

In a refinement, the control and communications circuit is configured to generate frequency shift signals for the power input signals, the frequency shift signals provided to the PWM signal generator and configured to alter a power level of the power signal of the inverter circuit by shifting the operating frequency, within the operating frequency range.

In accordance with another aspect of the disclosure, a power transmitter for wireless power transfer at an operating frequency selected from a range of about 87 kilohertz (kHz) to about 205 kHz is disclosed. The power transmitter includes a control and communications unit configured to provide power control signals to a power supply external to the power transmitter for controlling a power level of a power signal configured for transmission to a power receiver, the power supply configured to configure a direct current (DC) power based on the power control signals, the control and communications unit further including a pulse width modulation (PWM) signal generator for determining and selecting the operating frequency from the operating frequency range. The power transmitter further includes an inverter circuit configured to receive the DC power from the power supply external to the power transmitter and convert the input power to a power signal, a coil configured to transmit the power signal to a power receiver, the coil formed of wound Litz wire and including at least one layer, the coil defining, at least, a top face, and a shielding comprising a ferrite core and defining a cavity, the cavity configured such that the ferrite core substantially surrounds all but the top face of the coil.

In a refinement, the shielding is an E-Core type shielding and the cavity is configured in an E-shape configuration.

In a refinement, a shielding outer edge of the shielding extends about 4.5 millimeters (mm) to about 6.5 mm outward from a coil outer edge of the coil.

In a refinement, the coil has an outer diameter length in a range of about 40 mm to about 50 mm.

In a refinement, the coil has an inner diameter length in a range of about 15 mm to about 25 mm.

In a refinement, the at least one layer comprises a first layer and a second layer.

In a further refinement, the first layer includes a first number of turns in a range of about 4 turns to about 5 turns, and wherein the second layer includes a second number of turns in a range of about 4 turns to about 5 turns.

In yet another aspect of the disclosure, a system for wireless power transfer at an operating frequency selected from an operating frequency range, the operating frequency range being about 87 kilohertz (kHz) to about 205 kHz is disclosed. The system includes a power transmitter and a power supply. The power transmitter includes a control and communications unit configured to provide power control signals for controlling a power level of a power signal configured for transmission to a power receiver and including a pulse width modulation (PWM) signal generator for determining and selecting the operating frequency from the operating frequency range. The power transmitter further includes an inverter circuit configured to receive a direct current (DC) power and convert the input power to a power signal, a coil configured to transmit the power signal to a power receiver, the coil formed of wound Litz wire and including at least one layer, the coil defining, at least, a top face, and a shielding comprising a ferrite core and defining a cavity, the cavity configured such that the ferrite core substantially surrounds all but the top face of the coil. The power supply is supply external to the power transmitter, the power supply configured to configure the DC power based on the power control signals. The power supply includes a voltage regulator to configure the DC power to have a base DC voltage for the DC voltage and a power supply controller configured to receive the input power signals, generate voltage regulation instructions for altering the DC power, based on the power control signals, the voltage regulation instructions including instructions for selecting the base DC voltage for assignment as the DC voltage of the DC power, the base DC voltage selected from one or more preset DC power voltage levels, and provide the voltage regulation instructions to the voltage regulator to configure the a DC voltage of the DC power.

In a refinement, the preset DC power voltages include or more of 5 Volts (V), 9 V, 15 V, or 20 V.

In a refinement, the one or more base voltage levels includes a first base voltage level and a second base voltage level, the first base voltage level is electrically associated with a first base power level and the second base voltage level is electrically associated with a second base power level, and the frequency shift is determined such that an AC output power level for the power signal is greater than the first base power level and less than the second base power level.

In a refinement, the control and communications circuit is configured to generate frequency shift signals for the power input signals, the frequency shift signals provided to the PWM signal generator and configured to alter a power level of the power signal of the inverter circuit by shifting the operating frequency, within the operating frequency range.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
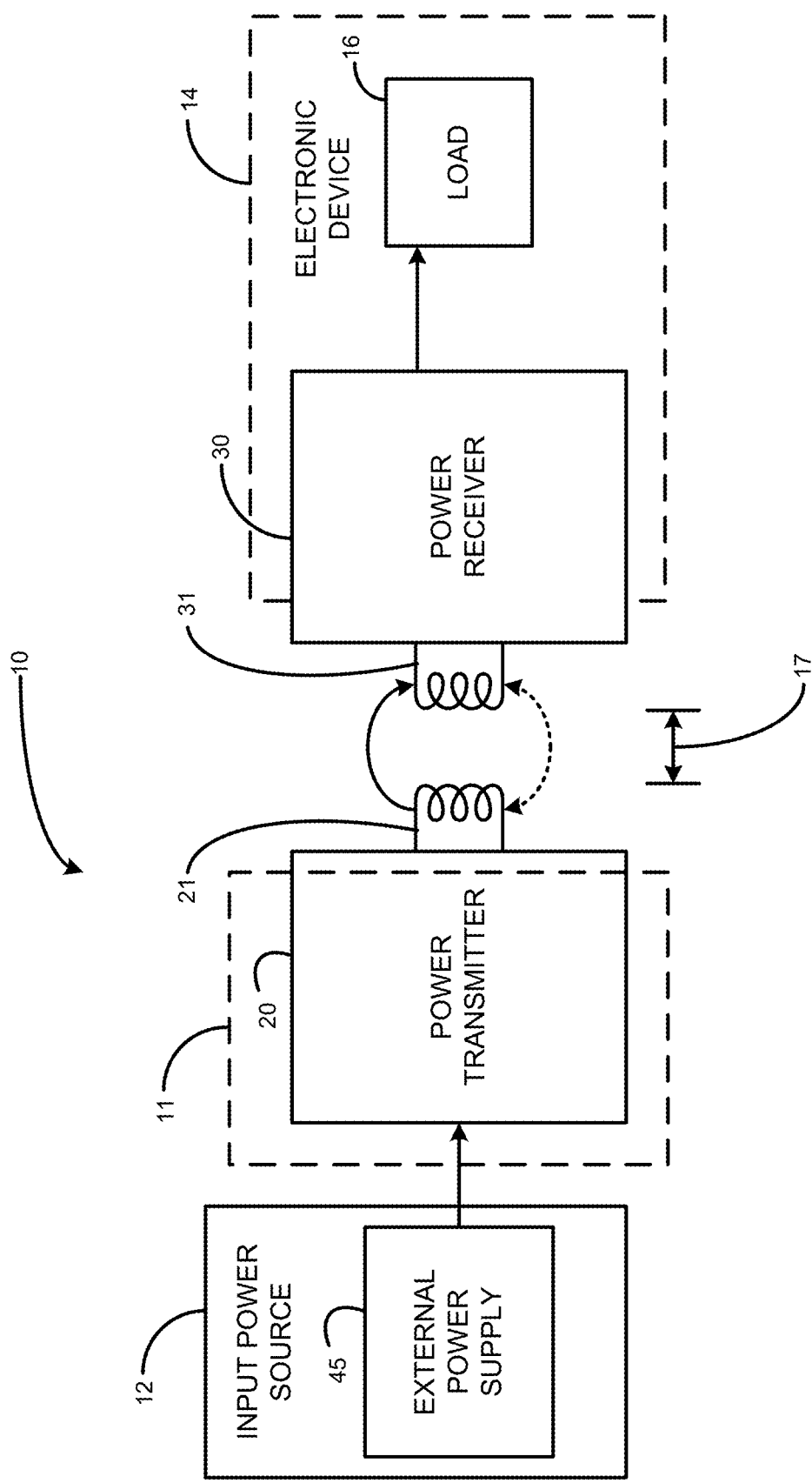
FIG. 1 is an exemplary block diagram of an embodiment of a wireless power transfer system, in accordance with an embodiment of the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power signals, and electromagnetic energy. Additionally, the wireless power transfer system 10 may provide for wireless transmission of electronically transmittable data ("electronic data") independent of and/or associated with the aforementioned electrical signals. Specifically, the wireless power transfer system 10 provides for the wireless transmission of electrical signals via near field magnetic coupling. As shown in the embodiment of FIG. 1, the wireless power transfer system 10 includes a power transmitter 20 and a power receiver 30. The power receiver 30 is configured to receive electrical energy, electrical power, electromagnetic energy, and/or electronic data from, at least, the power transmitter 20.

As illustrated, the power transmitter 20 and power receiver 30 may be configured to transmit electrical energy, via transmitter antenna 21 and receiver antenna 31, electrical power, electromagnetic energy, and/or electronically transmittable data across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as the gap 17, such as, but not limited to, air, a counter top, a casing for an electronic device, a grip device for a mobile device, a plastic filament, an insulator, a mechanical wall, among other things; however, there is no physical, electrical connection at such a separation distance or gap.

The combination of the power transmitter 20 and the power receiver 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the power transmitter 20 to the power receiver 30 remains possible.

The wireless power transfer system 10 operates when the power transmitter 20 and the power receiver 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the power transmitter 20 and the power receiver 30, in the system 10, may be represented by a resonant coupling coefficient of the system 10 and, for the purposes of wireless power transfer, the coupling coefficient for the system 10 may be in the range of about 0.01 and 0.9.

The power transmitter 20 may be operatively associated with a base station 11. The base station 11 may be a device, such as a charger, that is able to provide near-field inductive power, via the power transmitter 20, to a power receiver. In some examples, the base station 11 may be configured to provide such near-field inductive power as specified in the Qi™ Wireless Power Transfer System, Power Class 0 Specification. In some such examples, the base station 11 may carry a logo to visually indicate to a user that the base station 11 complies with the Qi™ Wireless Power Transfer System, Power Class 0 Specification.

The power transmitter 20 may receive power from an input power source 12. The base station 11 may be any electrically operated device, circuit board, electronic assembly, dedicated charging device, or any other contemplated electronic device. Example base stations 11, with which the power transmitter 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB or lighting ports and/or adaptors, among other contemplated electrical components). Further, as illustrated, the input power source 12 may include, may be implemented by, and/or may be operatively associated with, for the purpose of power distribution, an external power supply, which directly provides a direct current (DC) power input to the power transmitter 20. The external power supply may include or comprise one or more Universal Serial Bus (USB) power supplies, Lightning power supplies, Qualcomm Quick Charge devices, USB-C power supplies, USB-PD (USB Power Delivery) power supplies, Mini-USB power supplies, proprietary power supplies, input/outputs on electronic devices (e.g., a computer, a multi device charger, an automobile console, a mobile device, a portable power supply, a battery, a generator, among known power supplies.

Electrical energy received by the power transmitter 20 is then used for at least two purposes: providing electrical power to internal components of the power transmitter 20 and providing electrical power to the transmitter coil 21. The transmitter coil 21 is configured to wirelessly transmit the electrical signals conditioned and modified for wireless transmission by the power transmitter 20 via near-field magnetic coupling (NFMC). Near-field magnetic coupling enables the transfer of electrical energy, electrical power, electromagnetic energy, and/or electronically transmissible data wirelessly through magnetic induction between the transmitter coil 21 and a receiving coil 31 of, or associated with, the power receiver 30. Near-field magnetic coupling may enable "inductive coupling," which, as defined herein, is a wireless power transmission technique that utilizes an alternating electromagnetic field to transfer electrical energy between two or more antennas/coils. Such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in at least one circuit magnetically coupled to the first.

In one or more embodiments, the inductor coils of either the transmitter coil 21 or the receiver coil 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 87 kHz to about 205 kHz (Qi™ interface standard). The operating frequencies of the coils 21, 31 may be operating frequencies designated by the International Telecommunications Union (ITU) in the Industrial, Scientific, and Medical (ISM) frequency bands.

As known to those skilled in the art, a "resonant frequency" or "resonant frequency band" refers to a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments the transmitting antenna resonant frequency band extends from about 87 kHz to about 205 kHz. In one or more embodiments the inductor coil of the receiver coil 31 is configured to resonate at a receiving antenna resonant frequency or within a receiving antenna resonant frequency band.

In some examples, the transmitting coil and the receiving coil of the present disclosure may be configured to transmit and/or receive electrical power at a baseline power profile having a magnitude up to about 5 watts (W). In some other examples, the transmitting coil and the receiving coil of the present disclosure may be configured to transmit and/or receive electrical power at an extended power profile, supporting transfer of up to 15 W of power.

The power receiver 30 is configured to acquire near-field inductive power from the power transmitter 20. In some examples, the power receiver 30 is a subsystem of an electronic device 14. The electronic device 14 may be any device that is able to consume near field inductive power as specified in the Qi™ Wireless Power Transfer System, Power Class 0 Specification. In some such examples, the electronic device 14 may carry a logo to visually indicate to a user that the electronic device 14 complies with the Specification.

The electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an automotive device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy, electrical power signals, and/or electromagnetic energy over a physical and/or wireless electrical connection, in the form of power signals that are, ultimately, utilized in wireless power transmission from the power transmitter 20 to the power receiver 30. Further, dotted lines are utilized to illustrate electronically transmittable data signals, which ultimately may be wirelessly transmitted from the power transmitter 20 to the power receiver 30.

Figure 2:
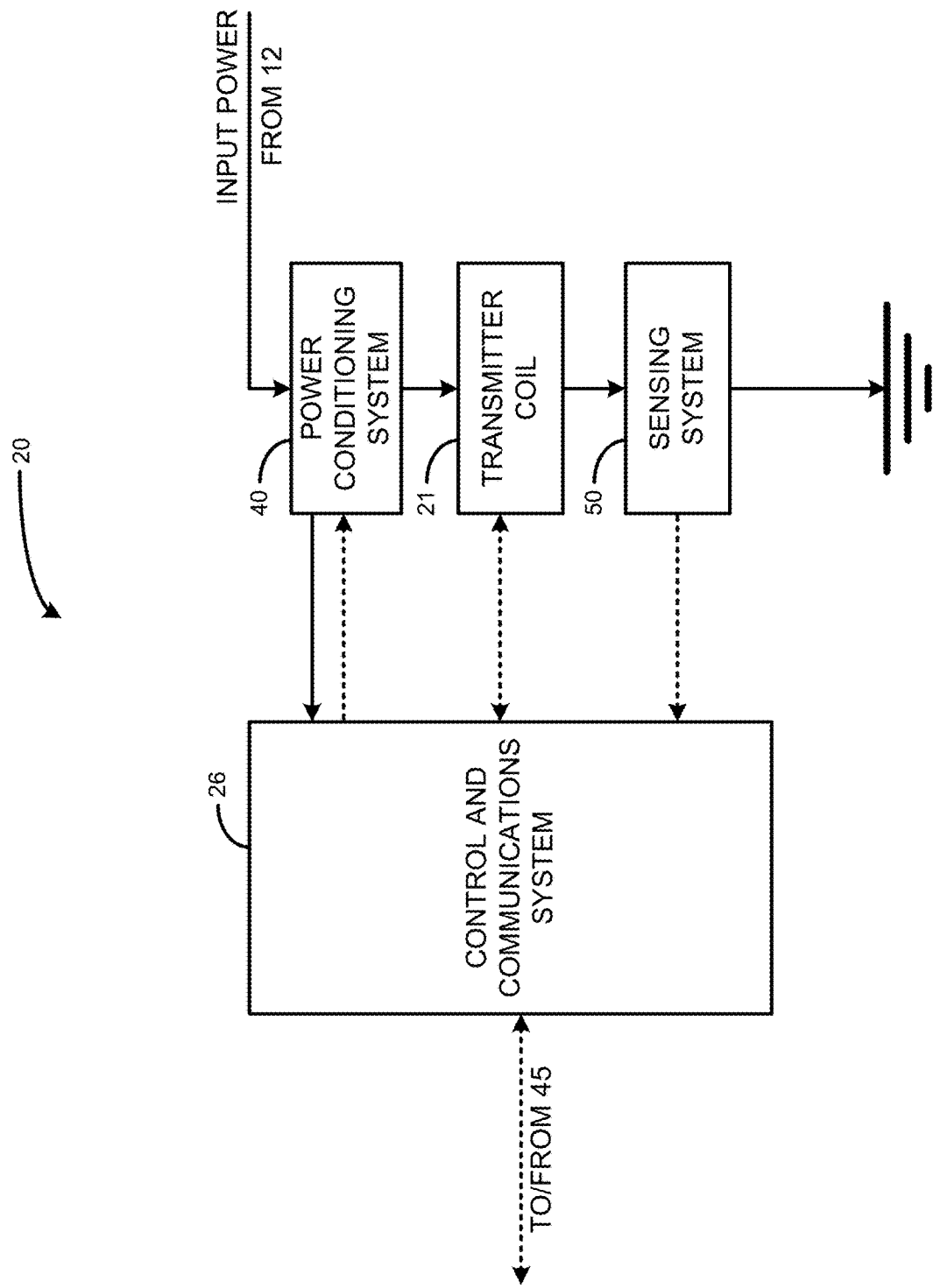
FIG. 2 is an exemplary block diagram for a power transmitter, which may be used in conjunction with the wireless power transfer system of FIG. 1, in accordance with FIG. 1 and an embodiment of the present disclosure.

Turning now to FIG. 2, the wireless power transfer system 10 is illustrated as a block diagram including example sub-systems of the power transmitter 20. The wireless transmission system 20 may include, at least, a power conditioning system 40, a control and communications system 26, a sensing system 50, and the transmission coil 21. The electrical energy input from the input power source 12, via the external power supply 45, is conditioned and/or modified for wireless power transmission, to the power receiver 30, via the transmission coil 21. Accordingly, the second portion of the input energy is modified and/or conditioned by the power conditioning system 40.

The control and communications system 26, generally, comprises digital logic portions of the power transmitter 20. The control and communications system 26 receives and decodes messages from the power receiver 30, executes the relevant power control algorithms and protocols, and drives the frequency of the AC waveform to control the power transfer. As discussed in greater detail below, the control and communications system 26 also interfaces with other sub-systems of the power transmitter 20. For example, the control and communications system 26 may interface with other elements of the power transmitter 20 for user interface purposes.

Figure 3:
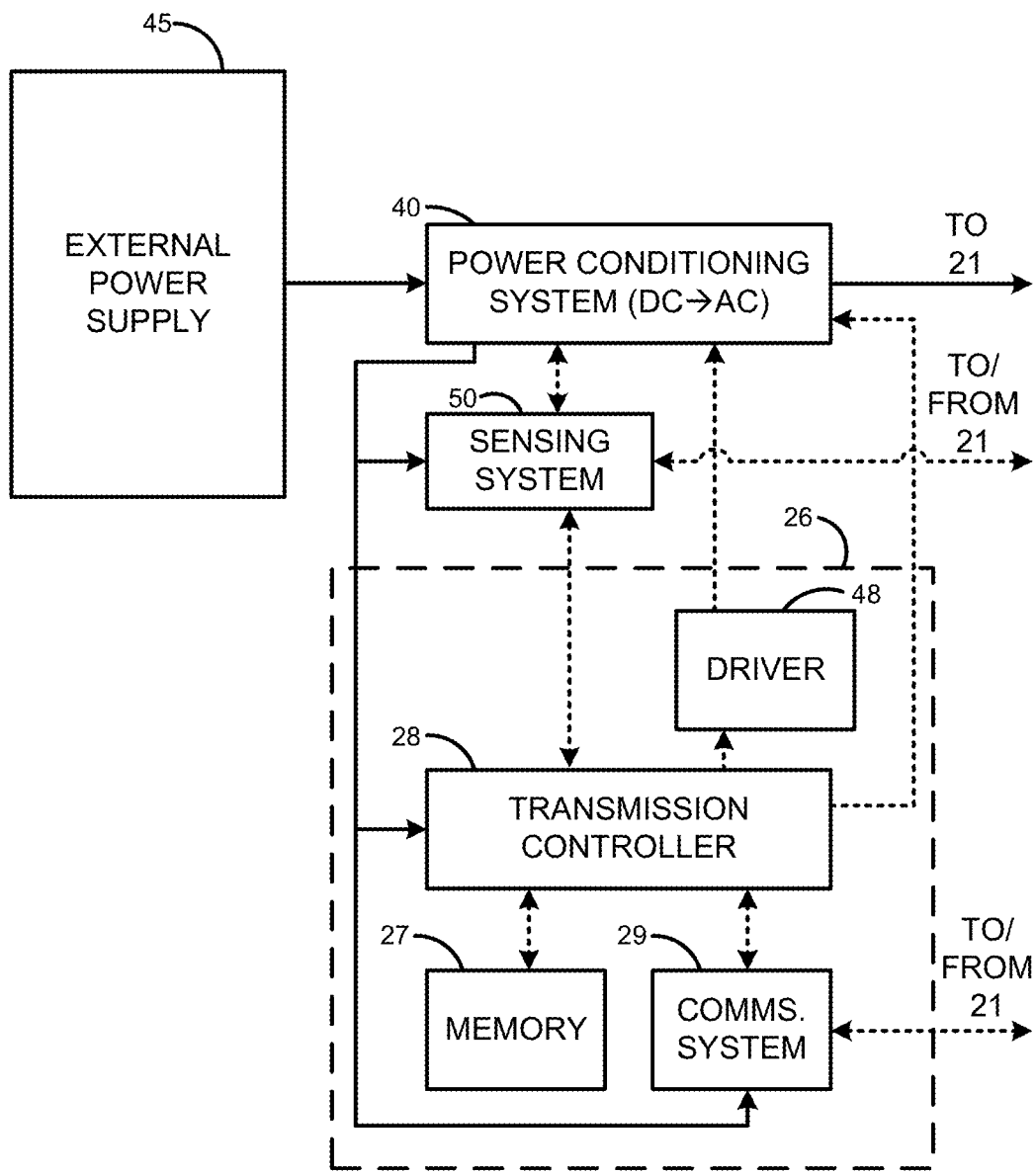
FIG. 3 is an exemplary block diagram for components of a control and communications system of the power transmitter of FIG. 2, in accordance with FIGS. 1-2 and an embodiment of the present disclosure.

Referring now to FIG. 3, with continued reference to FIGS. 1 and 2, subcomponents and/or systems of the control and communications system 26 are illustrated. The control and communications system 26 may include a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the power transmitter 20, and/or performs any other computing or controlling task desired. The transmission controller 28 may be a single controller or may include more than one controller disposed to control various functions and/or features of the power transmitter 20 such as, but not limited to, providing control instructions to the external power supply 45. Functionality of the transmission controller 28 may be implemented in hardware and/or software and may rely on one or more data maps relating to the operation of the power transmitter 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the control and communications system 26 are illustrated as independent components and/or circuits (e.g., the driver 48, the memory 27, the communications system 29, among other contemplated elements) of the control and communications system 26, such components may be integrated with the transmission controller 28. In some examples, the transmission controller 28 may be an integrated circuit configured to include functional elements of one or both of the transmission controller 28 and the power transmitter 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. As discussed in greater detail below with reference to FIGS. 6-7B, the PWM signal may be altered by the controller 28, for, at least, power control purposes.

The sensing system 50 may include one or more sensors, wherein each sensor may be operatively associated with one or more components of the power transmitter 20 and configured to provide information and/or data. The term "sensor" is used in its broadest interpretation to define one or more components operatively associated with the power transmitter 20 that operate to sense functions, conditions, electrical characteristics, operations, and/or operating characteristics of one or more of the power transmitter 20, the power receiver 30, the input power source 12, the base station 11, the transmission coil 21, the receiver coil 31, along with any other components and/or subcomponents thereof.

Figure 4:
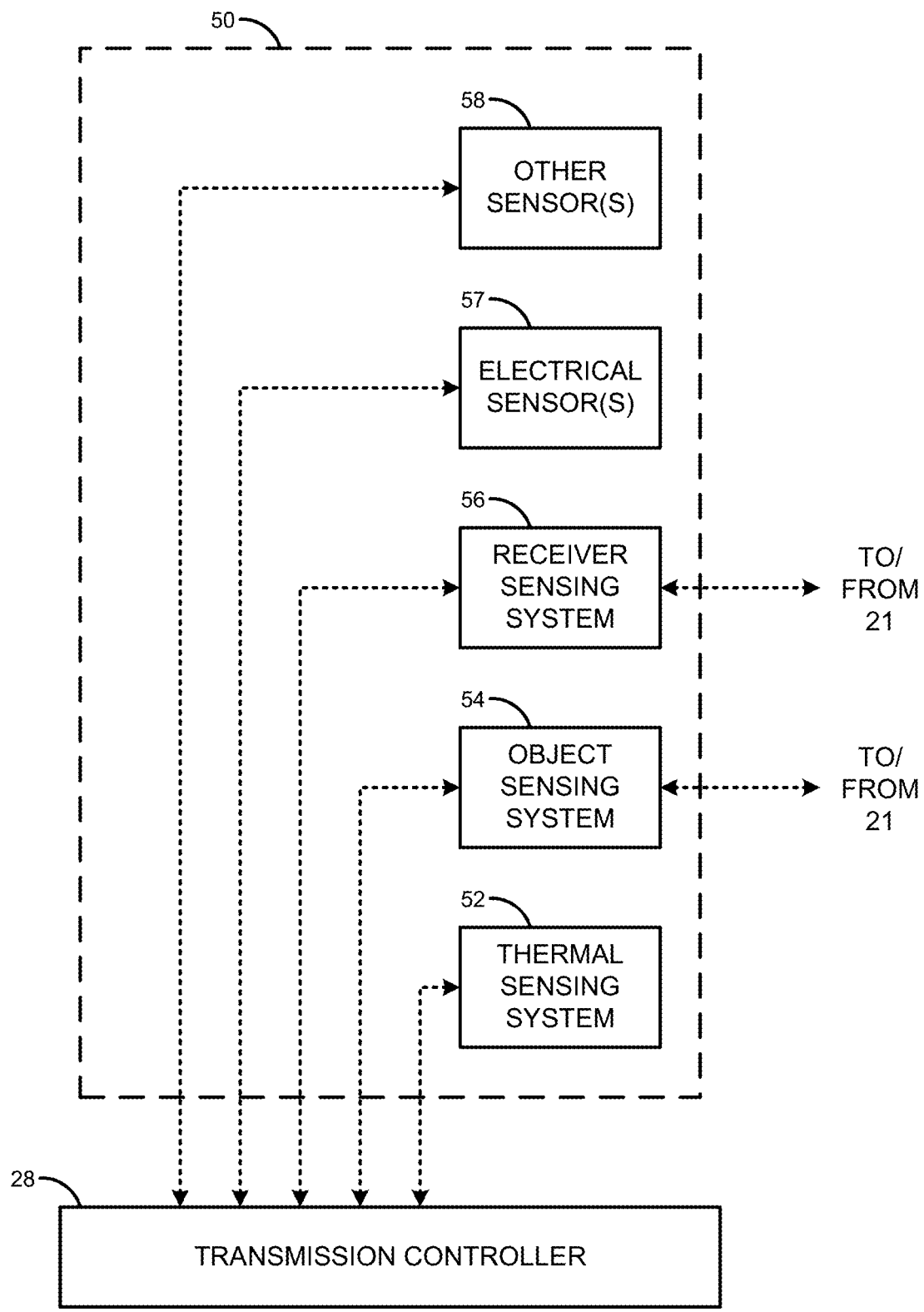
FIG. 4 is an exemplary block diagram for components of a sensing system of the control and communications system of FIG. 3, in accordance with FIGS. 1-3 and an embodiment of the present disclosure.

As illustrated in the embodiment of FIG. 4, the sensing system 50 may include, but is not limited to including, a thermal sensing system 52, an object sensing system 54, a receiver sensing system 56, electrical sensor(s) 57 and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the power transmitter 20 or other elements nearby the power transmitter 20. The thermal sensing system 52 may be configured to detect a temperature within the power transmitter 20 and, if the detected temperature exceeds a threshold temperature, the transmission controller 28 prevents the power transmitter 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the power transmitter 20 has increased from an acceptable operating temperature to an undesired operating temperature (e.g., in a non-limiting example, the internal temperature increasing from about 20° Celsius (C) to about 50° C., the transmission controller 28 prevents the operation of the power transmitter 20 and/or reduces levels of power output from the power transmitter 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the power transmitter 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the power transmitter 20. In some examples, the object sensing system 54 utilizes an impedance change detection scheme, in which the transmission controller 28 analyzes a change in electrical impedance observed by the transmission coil 21 against a known, acceptable electrical impedance value or range of electrical impedance values. Additionally or alternatively, in some examples the object sensing system 54 may determine if a foreign object is present by measuring power output associated with the power transmitter 20 and determining power input associated with a receiver associated with the power transmitter 20. In such examples, the object sensing system 54 may calculate a difference between the power associated with the power transmitter 20 and the power associated with the receiver and determine if the difference indicates a loss, consistent with a foreign object not designated for wireless power transmission.

Additionally or alternatively, the object sensing system 54 may utilize a quality factor (Q) change detection scheme, in which the transmission controller 28 analyzes a change from a known quality factor value or range of quality factor values of the object being detected, such as the receiver coil 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the power transmitter 20. In some examples, if the presence of any such wireless receiving system is detected, wireless transmission of electrical energy, electrical power, electromagnetic energy, and/or data by the power transmitter to said wireless receiving system is enabled. In some examples, if the presence of a wireless receiver system is not detected, wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the power transmitter 20 and, based on the electrical characteristics, determine presence of a power receiver 30.

The electrical sensor(s) 57 may include any sensors configured for detecting and/or measuring any current, voltage, and/or power within the power transmitter 20. Information provided by the electrical sensor(s) 57, to the transmission controller 28, may be utilized independently and/or in conjunction with any information provided to the transmission controller 28 by one or more of the thermal sensing system 52, the object sensing system 54, the receiver sensing system 56, the other sensor(s) 58, and any combinations thereof.

Figure 5:
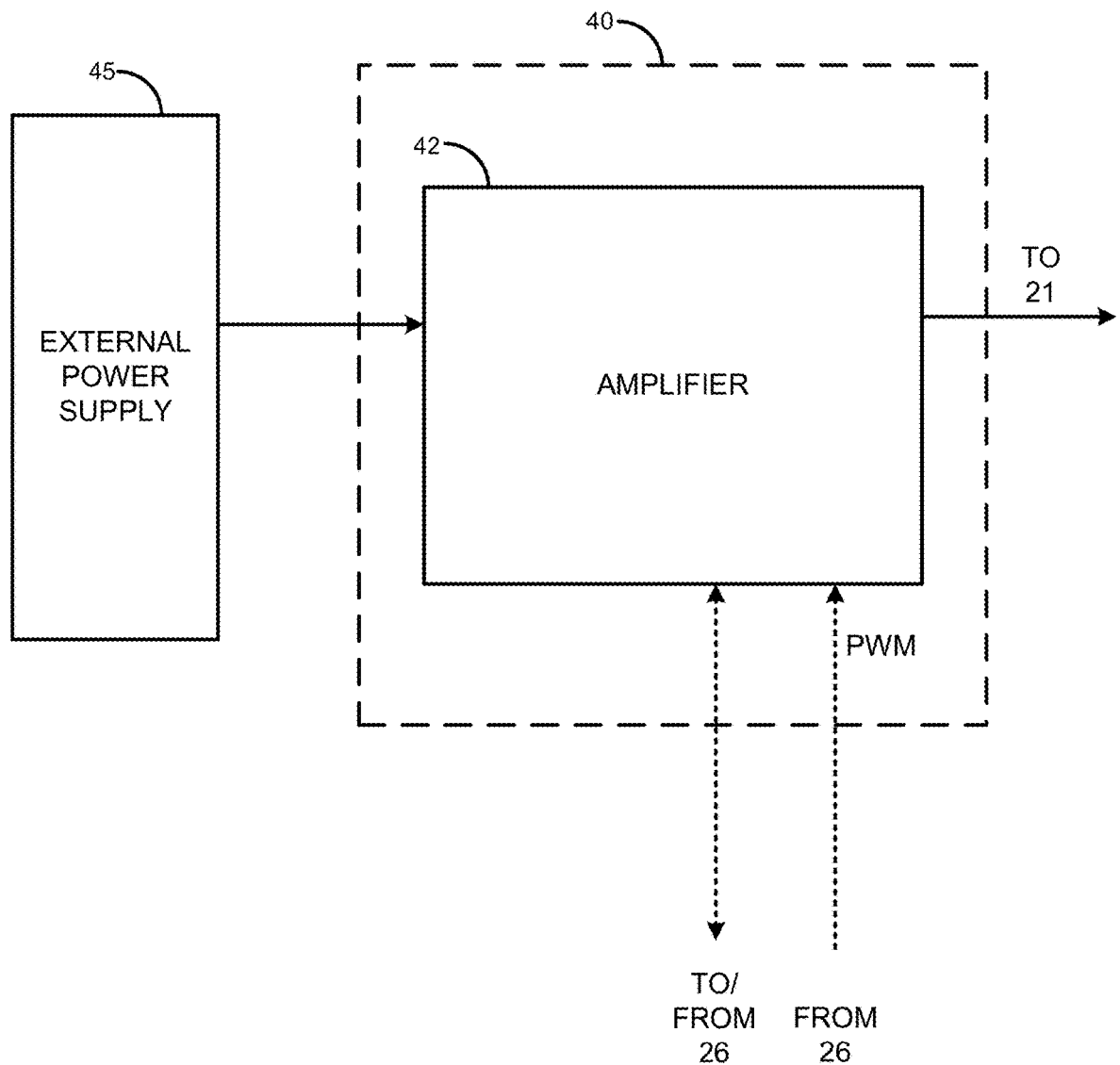
FIG. 5 is an exemplary block diagram for components of a power conditioning system of the power transmitter of FIGS. 1-2, in accordance with FIGS. 1-2 and an embodiment of the present disclosure.

Referring now to FIG. 5, and with continued reference to FIGS. 1-4, a block diagram illustrating an embodiment of the power conditioning system 40 is illustrated. At the power conditioning system 40, electrical power is received, generally, as a DC power source, via the external power supply 45. The electrical power is provided to an amplifier 42 of the power conditioning system 40, which is configured to condition the electrical power for wireless transmission by the coil 21. The amplifier 42 may function as an inverter, which receives a DC power signal from the external power supply 45 and generates an AC power signal as output, based, at least in part, on PWM input from the transmission control system 28. The amplifier 42 may be or include, for example, a power stage inverter. The use of the amplifier 42 within the power conditioning system 40 and, in turn, the power transmitter 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 milliwatts (mW) to about 60 W.

Figure 6A:
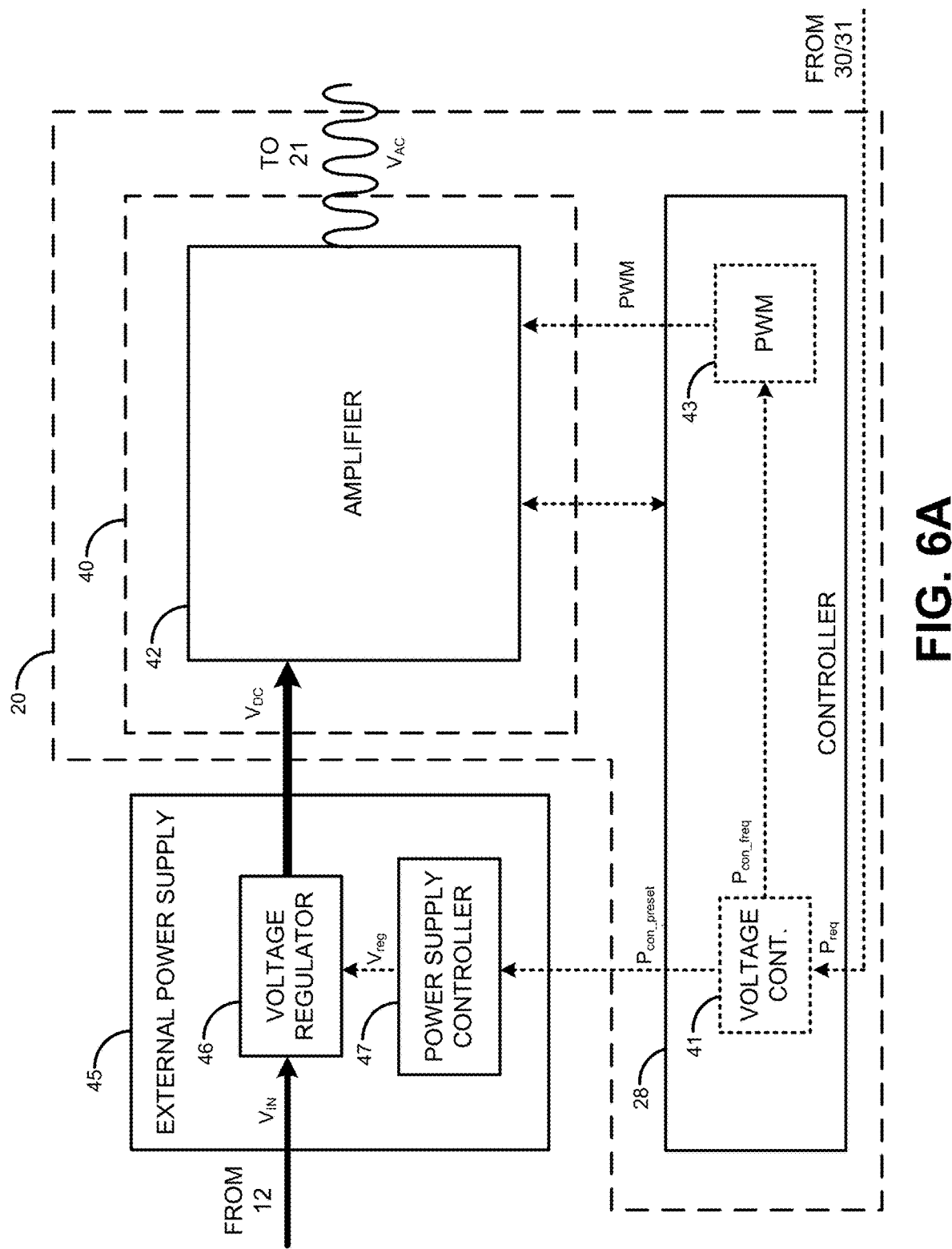
FIG. 6A is an exemplary block diagram for components of the power transmitter of FIGS. 1-5 and an external power supply of the wireless power transfer system of FIG. 1, in accordance with FIGS. 1-5 and the present disclosure.
Figure 6B:
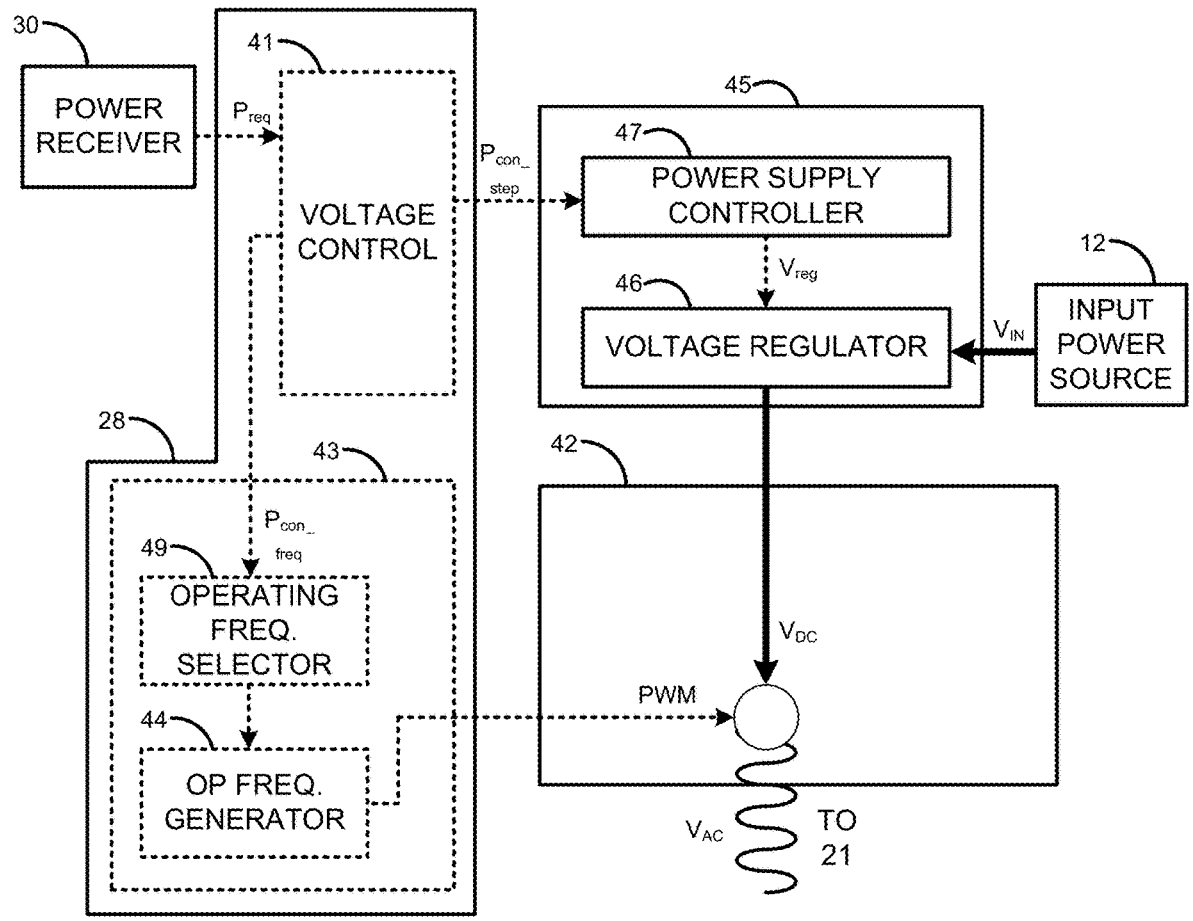
FIG. 6B is an exemplary block diagram illustrating similar components of the power transmitter as those of FIG. 6A, but further illustrating a duty cycle shift in the process of generating a power signal, in accordance with FIGS. 1-6A and the present disclosure.

Turning now to FIGS. 6A and 6B, with continued reference to FIGS. 1-5, components of the power transmitter 20 and the external power supply 45 are illustrated, for the purposes of describing power control methods, schemes, and/or components of the power transmitter 20. To that end, the block diagram of FIG. 6A illustrates interaction between one or more of the power conditioning system 40, the amplifier 42, the controller 28, the external power supply 45, or components thereof.

The external power supply 45, as discussed above, may be any suitable power supply, which is configurable for providing a proper DC power signal ($V_{DC}$), at a DC voltage, to the amplifier 42. The DC power is conditioned for wireless power transmission as an alternating current (AC) power signal ($V_{AC}$), via the transmitter antenna 21. In some examples, the external power supply 45 may provide $V_{DC}$ directly to the amplifier 42, absent any additional voltage step up or down via physical electrical components (e.g., an internal DC/DC converter of the power transmitter 20).

However, while not utilizing hardware internal to the power transmitter to alter $V_{DC}$, it is certainly contemplated, as discussed below, that voltage, current, and/or power levels of the resultant power signal $V_{AC}$ may be altered by control via the controller 28.

The external power supply 45 receives an input power $V_{IN}$, which may be any DC or AC input power, to be conditioned by the external power supply 45, for output directly to the amplifier 42 as $V_{DC}$. A voltage regulator 46 receives $V_{IN}$ from the input power source 12 and is configured to provide electrical power to the amplifier 42. Accordingly, the voltage regulator 46 is configured to convert the received electrical power into a power signal at a proper voltage for operation of the respective downstream components. The voltage regulator 46 may be any voltage regulator known in the art that is capable of converting in input voltage to an output, direct current voltage, which may include one or more DC/DC converters, amplifiers, transistors, transformers, inverters, switches, switching systems, among other known voltage regulators. To that end, the voltage regulator 46 may be configured to step up $V_{IN}$ to result in $V_{DC}$, step down $V_{IN}$ to result in $V_{DC}$, and/or maintain a substantially similar voltage $V_{IN}$ to result in $V_{DC}$.

Such stepping up, stepping down, and/or maintenance of the voltage for generating $V_{DC}$ may be controlled by a power supply controller 47 of the external power supply 45. The power supply controller 47 may include any internal firmware and/or may respond to signals from any external controllers (e.g., the transmission controller 28) for determining instructions for provision to the voltage regulator 46, to control voltage levels for the resultant $V_{DC}$. As discussed in more detail below, one or more control methods, schemes, and/or components are utilized by the power supply controller 47 to output the desired $V_{DC}$ directly to the amplifier 42.

The power supply controller 47 may be any electronic controller or computing system that includes, at least, a processor which performs operations, executes control algorithms, stores data, retrieves data, gathers data, controls and/or provides communication with other components and/or subsystems associated with external power supply 45, and/or performs any other computing or controlling task desired. The power supply controller 47 may be a single controller or may include more than one controller disposed to control various functions and/or features of the external power supply 45. Functionality of the power supply controller 47 may be implemented in hardware and/or software and may rely on one or more data maps relating to the operation of the external power supply 45. To that end, the power supply controller 47 may be operatively associated with memory. The memory may include one or more of internal memory, external memory, and/or remote memory (e.g., a database and/or server operatively connected to the power supply controller 47 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media. In some examples, power supply controller 47 may be an integrated circuit configured to include functional elements of one or both of the power supply controller 47 and the external power supply 45, generally.

As illustrated in FIGS. 6A-D, the transmission controller 28 may be utilized for communications with one or more of the external power supply 45, the power supply controller 47, or the amplifier 42, for controlling power levels of power signals within the power transmitter 20. Particularly, the transmission controller 28 is configured to provide power control signals ($P_{con}$) to control a power level of the power signal $V_{AC}$, $V_{AC}$ configured for transmission to the power receiver 30. For controlling voltages of one or more of $V_{AC}$, $V_{DC}$, or any intervening power signals of the power transmitter 20, the transmitter controller 28 may include, implement, execute firmware to implement, and/or functionally provide a voltage controller 41 and a pulse-width modulation signal (PWM) generator 43.

The voltage controller 41 is, generally, configured to provide one or both of control instructions for stepping up or stepping down the DC power signal $V_{DC}$ or altering power levels of the AC power signal $V_{AC}$. Further, to determine the power control signals ($P_{con}$), the voltage controller may be configured to receive power request signals ($P_{req}$) from the power receiver 30 and determine $P_{con}$ based, at least in part, on $P_{req}$. $P_{req}$ may be any information that determines a desired power level for transmission to the power receiver 30, such as, but not limited to, a current charge level of a load associated with the power receiver 30, a voltage at a rectifier of the power receiver 30, a load resistance associated with the power receiver 30, among other electrical information associated with the power receiver 30.

For controlling voltage levels of $V_{DC}$, upon input to the amplifier 42, from the external power supply 45, the transmitter controller 28 is configured to provide $P_{con}$, at least in part, to the external power supply 45, such that the power supply may utilize information of $P_{con}$ to configure $V_{DC}$ based, at least in part, on $V_{IN}$ and $P_{con}$, and provide $V_{DC}$ to the amplifier 42. In some such examples, such as those illustrated in FIG. 6A, the power supply controller 47 is configured to receive $P_{con}$, at least in part, and generate voltage regulation instructions (Vreg), Vreg configured for altering the DC voltage of $V_{DC}$, based on $P_{con}$. The power supply controller 47 provides Vreg to the voltage regulator 46, for the voltage regulator 46 to regulate and/or control levels of the DC voltage of $V_{DC}$, prior to input to the amplifier 42.

In some examples, information of $P_{con}$ transmitted to the power supply controller 47 may include voltage preset selection instructions ($P_{con}$ preset). $P_{con}$ preset includes a selection of a base DC voltage for the DC power, wherein said selection is selected from one or more preset DC power voltage levels. The preset DC power voltages may be any number of voltages, such that the external power supply 45 knows the preset DC power voltages and the controller 28 is capable of communicating a desired preset DC power voltage to the external power supply 45. In some examples, the preset DC voltages may be proprietary, with specific voltage levels configured for operation of specific devices and/or operations. In some examples, the preset DC power voltages include one or more of 5 Volts (V), 9 V, 12 V, 15 V, or 20V. Utilizing preset DC voltages in control of an external power supply 45 may allow for the power transmitter 20 to effectively utilize off-the-shelf, inexpensive power supplies, in place of more costly internal voltage regulation hardware.

In some other examples, the preset DC voltages may be a steps at constant rate of change in voltage, from which the power supply 45 is configured to any power level that is a multiple of the step level, up to an upper-bound maximum output power. Utilizing small step levels may allow for greater granularity in power control, by the power transmitter 20, utilizing external power regulation of the external power supply 45. For example, the step level may be in a range of about 10 millivolts (mV) to about 500 mV.

Turning now to FIG. 6B, the PWM generator 43 may be utilized for providing a PWM signal to the amplifier, for forming $V_{AC}$ based, at least in part, on the input $V_{DC}$ of the amplifier 42. The PWM generator 43 may generate the PWM signal based, at least, on an operating frequency provided by the operating frequency generator 44. In some examples, the operating frequency produced by the operating frequency generator 44 may be selected from a range of about 87 kHz to about 205 kHz.

In some examples, the PWM generator 43 further includes an operating frequency selector 49. The operating frequency selector 49 may receive frequency shift signals ($P_{con\_freq}$) of $P_{con}$ for shifting the operating frequency selected at the frequency generator 44, in response to power requirements for the power transmitter 20. In some examples, $P_{con\_freq}$ may be frequency shift information for granularly shifting the output power for $V_{AC}$, based on electrical characteristics of the transmission system 20 response to a particular frequency, within the operating frequency range. For example, the operating frequency, for a frequency shift, may be selected based on known or derived voltage or current characteristics at a given frequency.

In a non-limiting example, based on operating point analysis of a wireless power transmitter, it is found that a current output for the power transmitter 20, is greater at a higher operating frequency within the operating range of about 87 kHz to about 205 kHz, wherein the relationship between current output and operating frequency is non-linear. Thus, at a constant DC voltage for the DC power input to the amplifier 42, altering the operating frequency, thus altering the current output off the power transmitter 20, may raise or lower the output power for $V_{AC}$. To that end, the frequency selector 49 may receive demands for alterations in the base DC voltage of the power supply 45 and granularly determine and generate the resultant output power for $V_{AC}$.

Figure 6C:
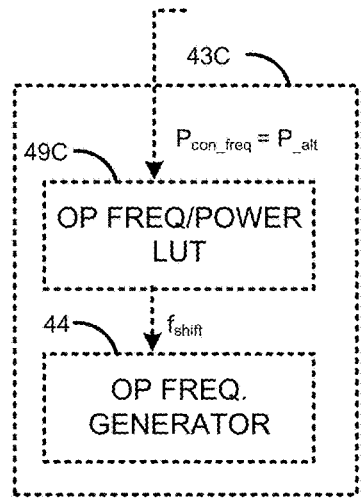
FIG. 6C is an exemplary block diagram illustrating components and/or functions associated with one or more of a transmitter controller, a pulse width modulation generator, or components thereof of FIGS. 6A and 6B, in accordance with FIGS. 1-6B and the present disclosure.
Figure 6D:
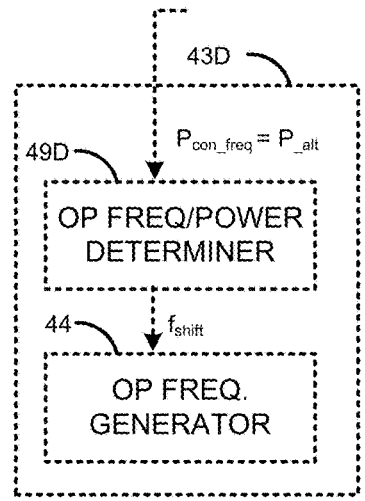
FIG. 6D is another exemplary block diagram illustrating components and/or functions associated with one or more of a transmitter controller, a pulse width modulation generator, or components thereof of FIGS. 6A-C, in accordance with FIGS. 1-6C and the present disclosure.

For the purposes of explanation and example, FIGS. 6C and 6D are included to illustrate exemplary implementations of the operating frequency selector 49 and its interaction with the operating frequency generator 44 of the PWM signal generator 43. FIG. 6C illustrates a PWM signal generator 43A that receives $P_{con\_freq}$ as frequency alteration information ($P_{alt}$) of $P_{con}$. The PWM signal generator 43C includes a look up table (LUT) 49C, which is referenced to determine a frequency shift for the operating frequency, to achieve the desired frequency alteration of $P_{alt}$. To that end, the LUT 49C may be any database, table, memory, memory accessed remotely, and/or data source which compares a change in power, current, and/or voltage of an output power of the power transmitter 20, with a frequency and/or frequency shift of the operating frequency, which would cause the desired change in power, current and/or voltage of the output power of the power transmitter 20. To that end, data stored in and/or accessed by the LUT 49C may be predetermined by one or more of known characteristics of the power transmitter 20, experimental results regarding operation of the power transmitter 20 and/or components thereof, derivations and/or models regarding electrical performance of the power transmitter 20, known electrical and/or physical characteristics associated with the power transmitter 20 and/or components thereof, or any other known electrical to frequency characteristic relationships.

Additionally or alternatively, as illustrated in the example of FIG. 6D, a PWM signal generator 43 may include a determiner 49D, for determining a proper operating frequency shift, based on values of $P_{alt}$. Thus, the determiner 49D may be any non-static model, simulation, derived relationship, control loop, integrator, and/or determiner, which receives a requested power change and determines an operating frequency shift, for said power change, based on known values for the base DC power signal and the desired change from the base DC power level. The determiner 49D may be based on experimental derivations, mathematical derivations, observed results derived into a modelled result, among other systems, methods, and apparatus for determining the relationship between power and operating frequency for a given power transmitter 20.

By utilizing the frequency shifting systems, methods, and/or apparatus in conjunction with the external power supply control systems methods and/or apparatus, granular power level control for an output power signal can be achieved by the power transmitter 20. Additionally, such systems, methods, and/or apparatus may allow for greater granularity in controls and/or greater range of controls, without need to include additional and/or costly voltage regulation hardware within the power transmitter 20, itself. As discussed above, said systems, methods, and apparatus are beneficial for utilizing the power transmitter 20 with known, affordable, off-the-shelf power supply components, for cost reduction and/or bill of materials reduction.

Figure 7:
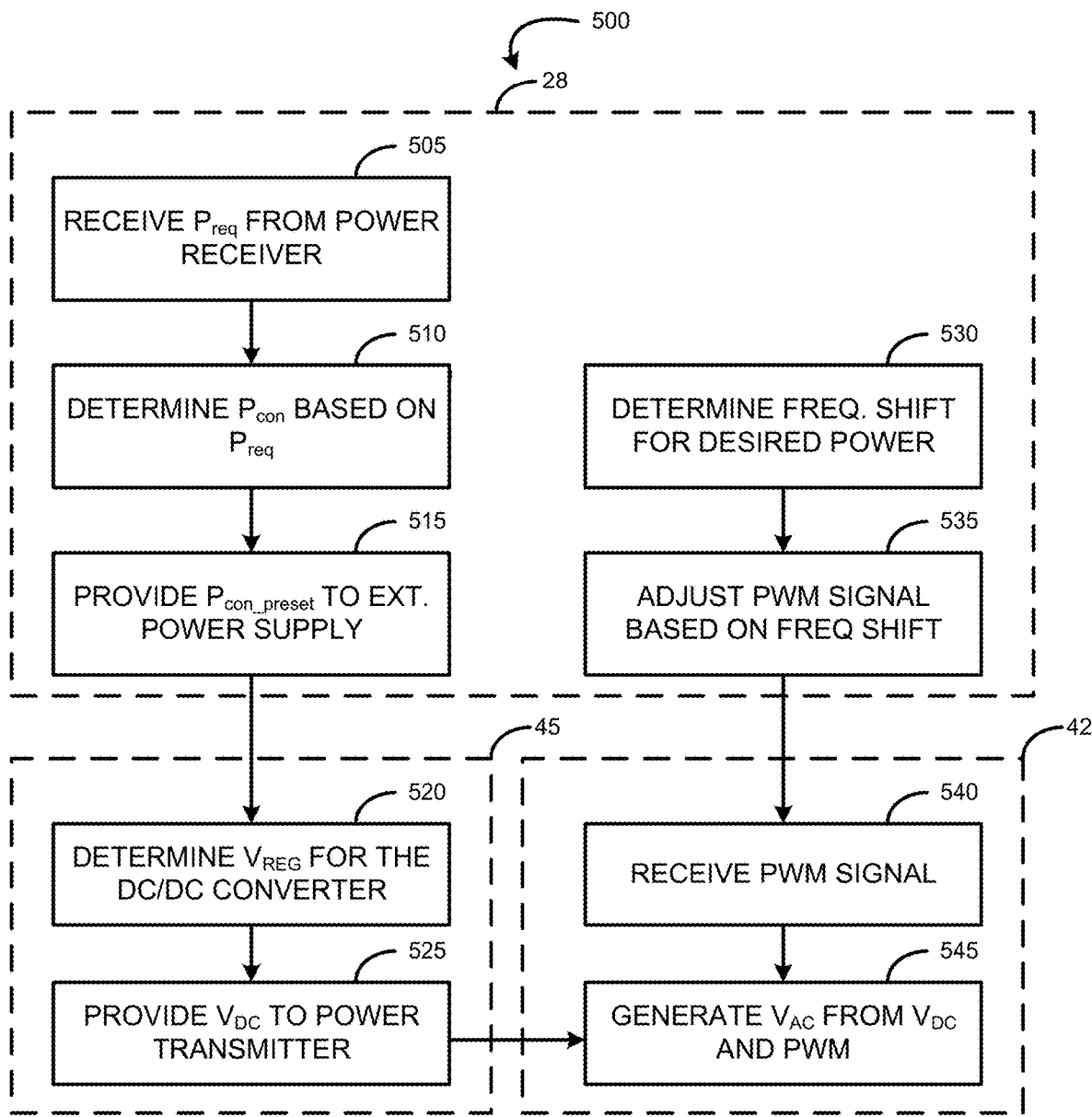
FIG. 7 is a block diagram for a method of controlling power output in the wireless power transmitter of FIGS. 1-6 and utilizing elements illustrated in FIGS. 6, in accordance with FIGS. 1-6 and the present disclosure.

Turning now to FIG. 7 and with continued reference to FIGS. 6A-D, a block diagram for an exemplary method 500 for controlling power input and/or output of the power transmitter 20 is illustrated. The method 500 may begin at block 505, wherein the transmitter controller 28 receives $P_{req}$ from the power receiver 30. As illustrated in block 510, the method 500 may include determining $P_{con}$ based on $P_{req}$. Further, the method 500 includes providing $P_{con\_preset}$ of $P_{con}$ to the external power supply 45 and/or any components thereof.

The external power supply 45 determines Vreg based, at least, on $P_{con\_preset}$ (block 520) and determines and provides $V_{DC}$ to the power transmitter 20 (at the amplifier 42), based on Vreg (block 525).

In some examples, such as those best described with reference to FIG. 6C, the method 500 may further include determining an operating frequency shift for $P_{con}$ ($P_{con\_freq}$) for further desired voltage configuration of $V_{AC}$, as illustrated in block 530. Further, PWM may then be altered and/or adjusted, based on $P_{con\_freq}$, as illustrated in block 535.

The amplifier 42 is configured to receive the PWM signal from the transmitter controller 28, as illustrated in block 540. Then, the amplifier 42 generates $V_{AC}$ based, at least in part, on $V_{DC}$ and PWM, as illustrated in block 545.

Figure 8:
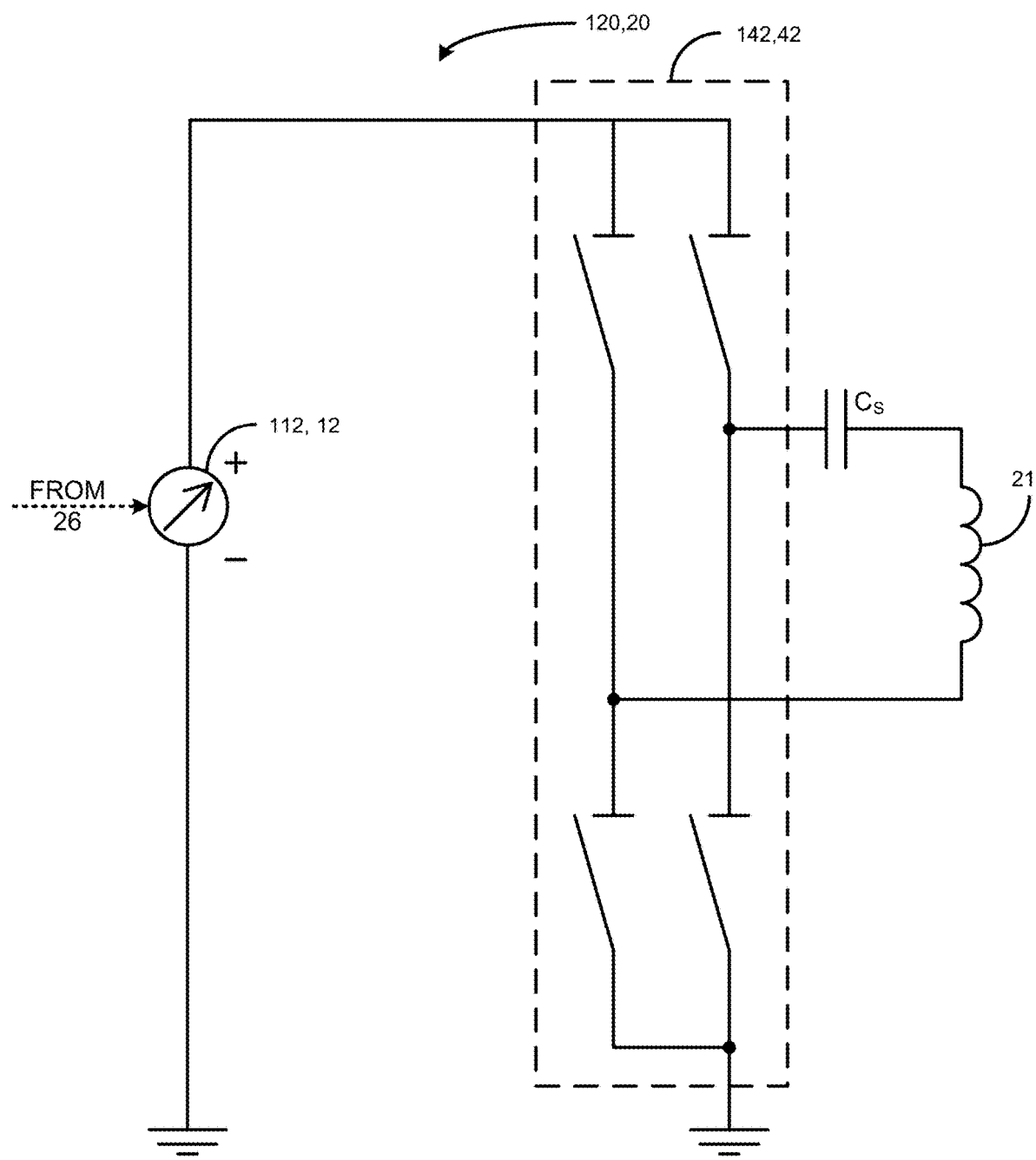
FIG. 8 is an exemplary electrical schematic diagram of components of the power transmitter of FIGS. 1-7, in accordance with FIGS. 1-7 and the present disclosure.

FIG. 8 is an exemplary schematic diagram 120 for an embodiment of the power transmitter 20. In the schematic, the amplifier 42 is a full-bridge inverter 142 which drives the transmitter coil 21 and a series capacitor $C_S$. In some examples, wherein the operating frequency of the power transmitter 20 is in the range of about 87 kHz and about 205 kHz, the transmitter coil 21 has a self-inductance in a range of about 5 µH to about 7 µH. In some such examples, $C_S$ has a capacitance in a range of about 400 nF to about 450 nF.

Based on controls configured by the control and communications system 26, an input power source 112, embodying the input power source 12, is altered to control the amount of power transferred to the power receiver 30. The input voltage of the input power source 112 to the full-bridge inverter 142 may be altered within a range of about 1 volt (V) to about 19 V, to control power output. In such examples, the resolution of the voltage of the input power source 112 may be 10 millivolts (mV) or less. In some examples, when the power transmitter 20, 120 first applies a power signal for transfer to the power receiver 30, the power signal of the input power source 112 has an initial input power voltage in a range of about 4.5 V to about 5.5 V.

The transmitter coil 21 may be of a wire-wound type, wound of, for example, Litz wire. As defined herein, Litz wire refers to a type of multistrand wire or cable utilized in electronics to carry an alternating current at a frequency. Litz wire is designed to reduce skin effect and proximity effect losses in conductors at frequencies up to about 1 MHz and consists of many thin wire strands, individually insulated and twisted or woven together, following a pattern. In some examples, the Litz wire may be no. 17 American Wire Gauge (AWG) (1.15 mm) type 2 Litz wire, having 105 strands of no. 40 AWG (0.08 mm diameter), or equivalent wire. In some examples, the Litz wire used for the transmitter coil 21 may be a bifilar Litz wire. To that end, utilizing thicker Litz wire, such as the no. 17 AWG type 2 Litz wire, utilizing bifilar Litz wire, and combinations thereof, may result in an increased Quality Factor (Q) for the transmitter coil 21 and higher Q may be directly related to increases in gap 17 height and/or Z-Distance. As Q is directly related to the magnitude of the magnetic field produced by the transmitter antenna 21 and, thus, with a greater magnitude magnetic field produced, the field emanating from the transmission antenna 21 can reach greater Z-distances and/or charge volumes, in comparison to legacy transmission coils, having lower Q designs. While Litz wire is described and illustrated, other equivalents and/or functionally similar wires may be used. Furthermore, other sizes and thicknesses of Litz wire may be used.

Figure 9:
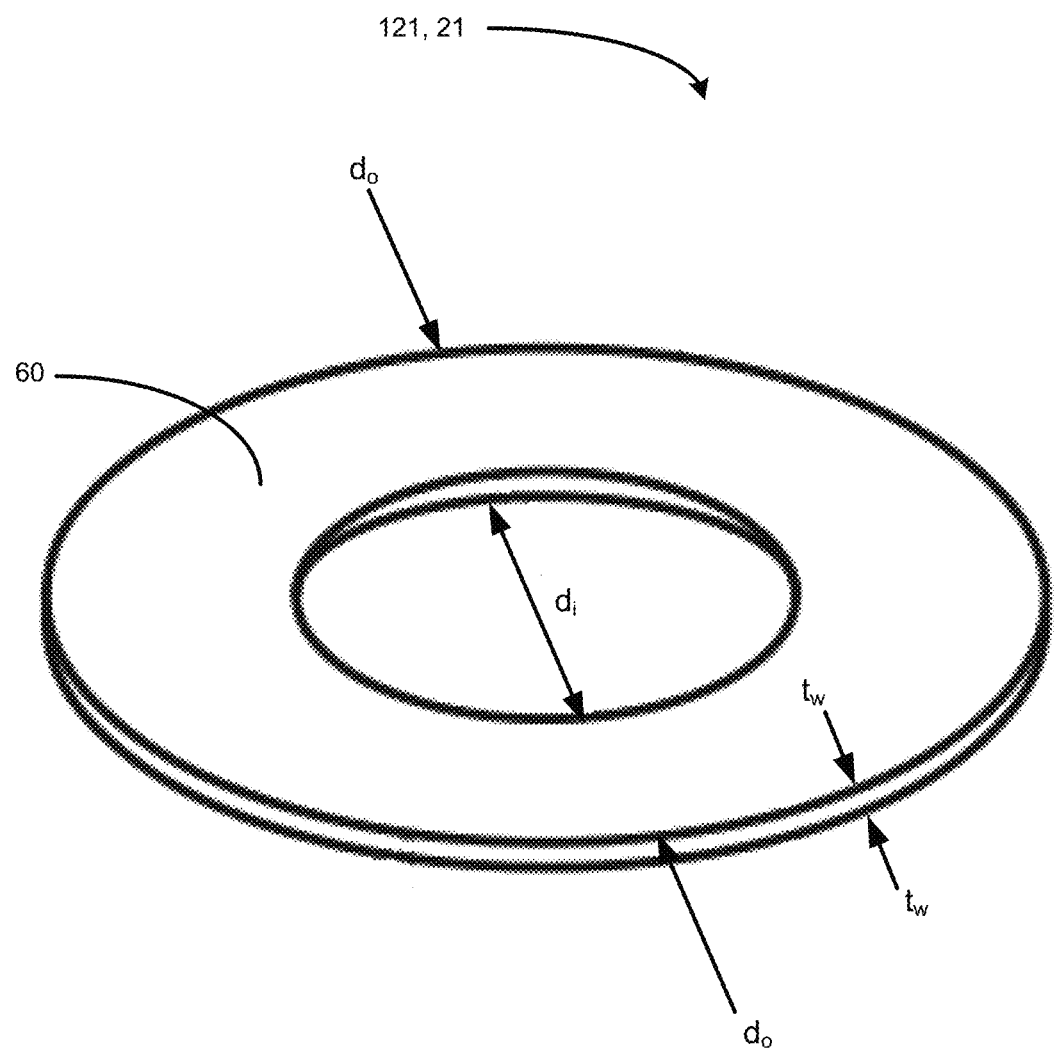
FIG. 9 is a perspective view of a shape of a transmitter coil of the power transmitter of FIGS. 1-8, in accordance with FIGS. 1-8 and an embodiment of the present disclosure.

Turning to FIG. 9, an exemplary diagram 121, for portraying dimensions of the transmitter antenna 21, is illustrated. The diagram 121 is a top perspective view of the transmitter antenna 21 and shows a top face 60 of the transmitter antenna 21. Note that the diagram 121 is not necessarily to scale and is for illustrative purposes. The top face 60 and the transmitter antenna 21, generally, are relatively circular in shape. As illustrated, an outer diameter do is defined as an exterior diameter of the transmitter antenna 21. In some examples, the outer diameter do has an outer diameter length in a range of about 40 mm to about 50 mm. An inner diameter di is defined as the diameter of the void space in the interior of the transmitter antenna 21. The inner diameter di may have an inner diameter length in a range of about 15 mm to about 25 mm. The outer diameter do and the inner diameter di may be relatively concentric, with respect to one another. The transmitter coil 21 has a thickness $t_w$, which is defined as the thickness of the wire of the coil. The thickness $t_w$ may be in a range of about 2 mm to about 3 mm. In such examples, the transmitter coil 21 may be made of Litz wire and include at least two layers, the at least two layers stacked upon each other. Utilization of one or more of an increased inner diameter di, an increased outer diameter do, multiple Litz wire layers for the antenna 21, specific dimensions disclosed herein, and/or combinations thereof, may be beneficial in achieving greater gap 17 heights and/or Z-distances. Other shapes and sizes of the transmitter antenna 21 may be selected based on the configuration with the selection of the shape and size of the shielding of the transmitter coil. In the event that a desired shielding in required, the transmitter antenna 21 may be shaped and sized such that the shielding surrounds the transmitter antenna 21 in accordance with an embodiment.

Figure 10:
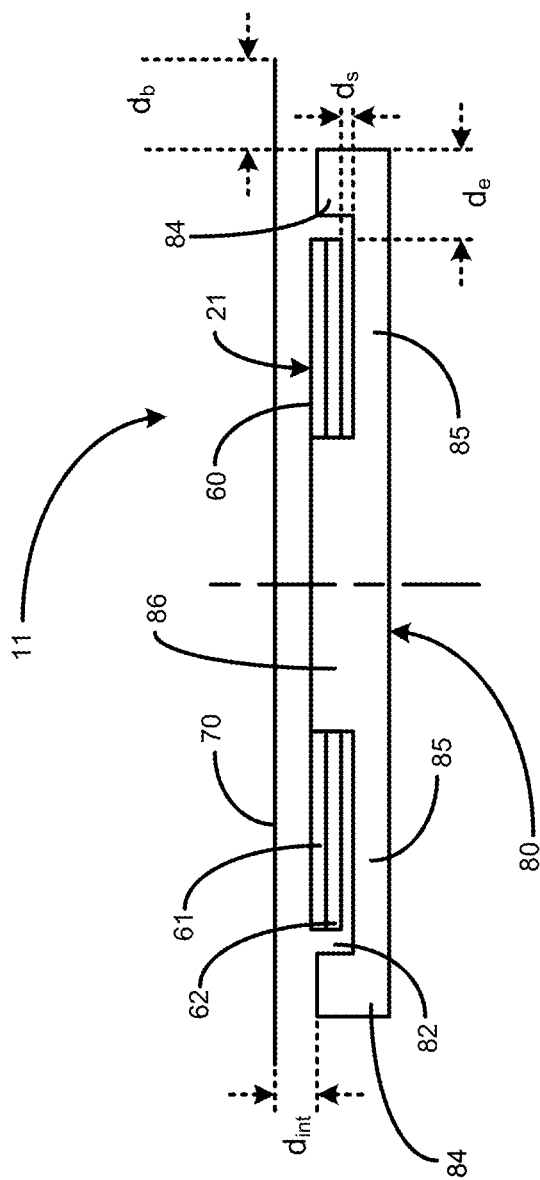
FIG. 10 is a cross-section of components of a base station, with which the power transmitter 20 is associated, in accordance with FIGS. 1-9 and the present disclosure.

Turning now to FIG. 10, a cross-sectional view of the transmitter coil 21, within the base station 11 and partially surrounded by a shielding 80 of the transmitter coil 21, is illustrated. The shielding 80 comprises a ferrite core and defines a cavity 82, the cavity configured such that the ferrite core substantially surrounds all but the top face 60 of the transmitter antenna 21 when the transmitter antenna 21 is placed in the cavity. As used herein, "surrounds" is intended to include covers, encircles, enclose, extend around, or otherwise provide a shielding for. "Substantially surrounds," in this context, may take into account small sections of the coil that are not covered. For example, power lines may connect the transmitter coil 21 to a power source. The power lines may come in via an opening in the side wall of the shielding 80. The transmitter coil 21 at or near this connection may not be covered. In another example, the transmitter coil 21 may rise slightly out of the cavity and thus the top section of the side walls may not be covered. By way of example, substantially surrounds would include coverage of at least $50_+\%$ of that section of the transmitter antenna. However, in other examples, the shielding may provide a greater or lesser extent of coverage for one or more sides of the transmitter antenna 21.

Figure 11:
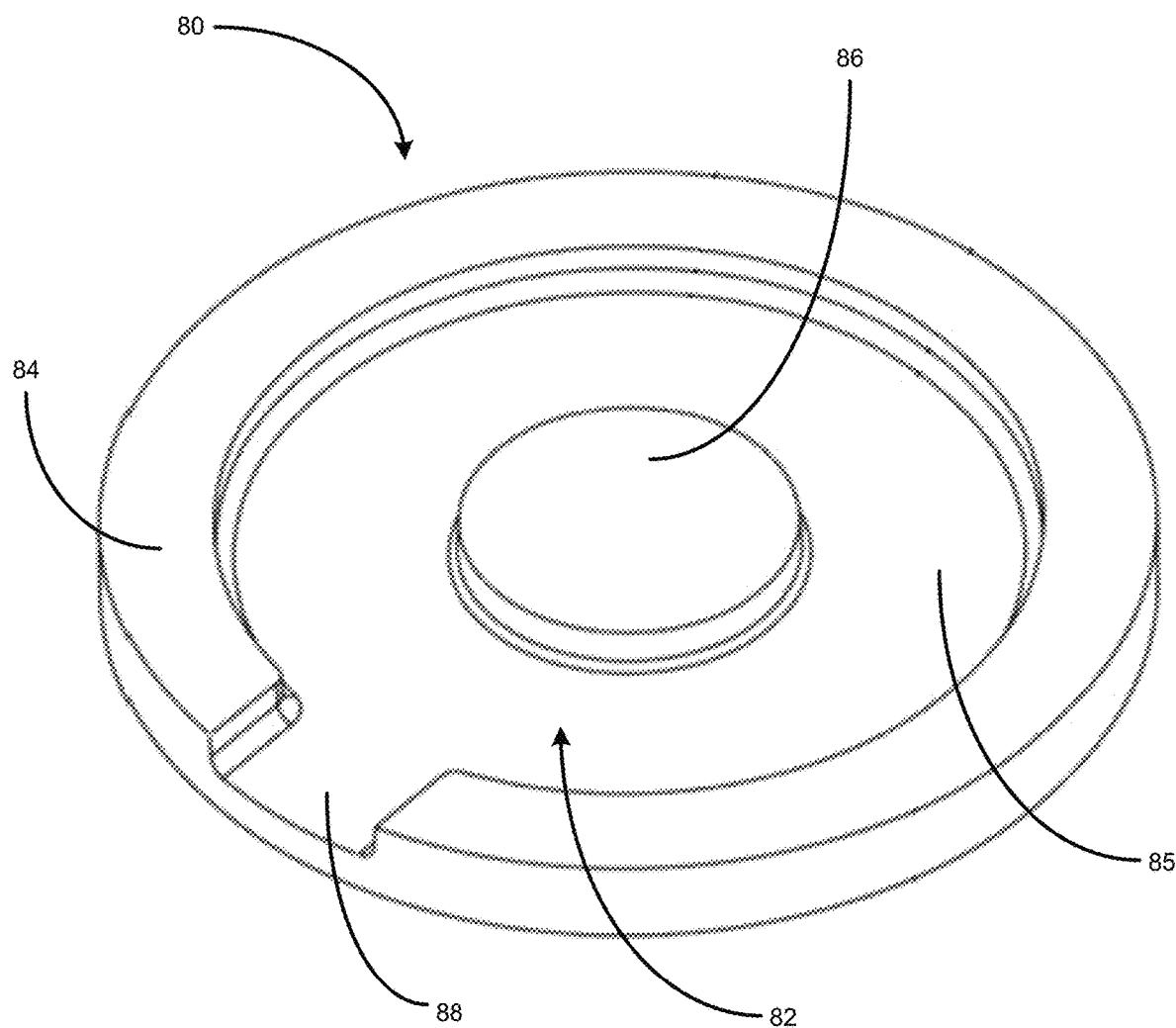
FIG. 11 is a perspective view of a shielding associated with the transmitter coil of FIGS. 1-10, in accordance with FIGS. 1-10 and an embodiment of the present disclosure.

In an embodiment, as shown in FIG. 11, the shielding 80 surrounds at least the entire bottom section of the transmitter antenna 21 and almost all of the side sections of the transmitter antenna 21. As used herein, the entire bottom section of the transmitter antenna 21 may include, for example, the entire surface area of the transmitter antenna 21 or all of the turns of the Litz wire of the transmitter antenna 21. With respect to the side walls, as shown in FIG. 8, the magnetic ring 84 does not extend all the way up the side wall of the transmitter antenna 21. However, as shown in other illustrations, the side wall may extend all the way up the side wall.

Figure 12A:
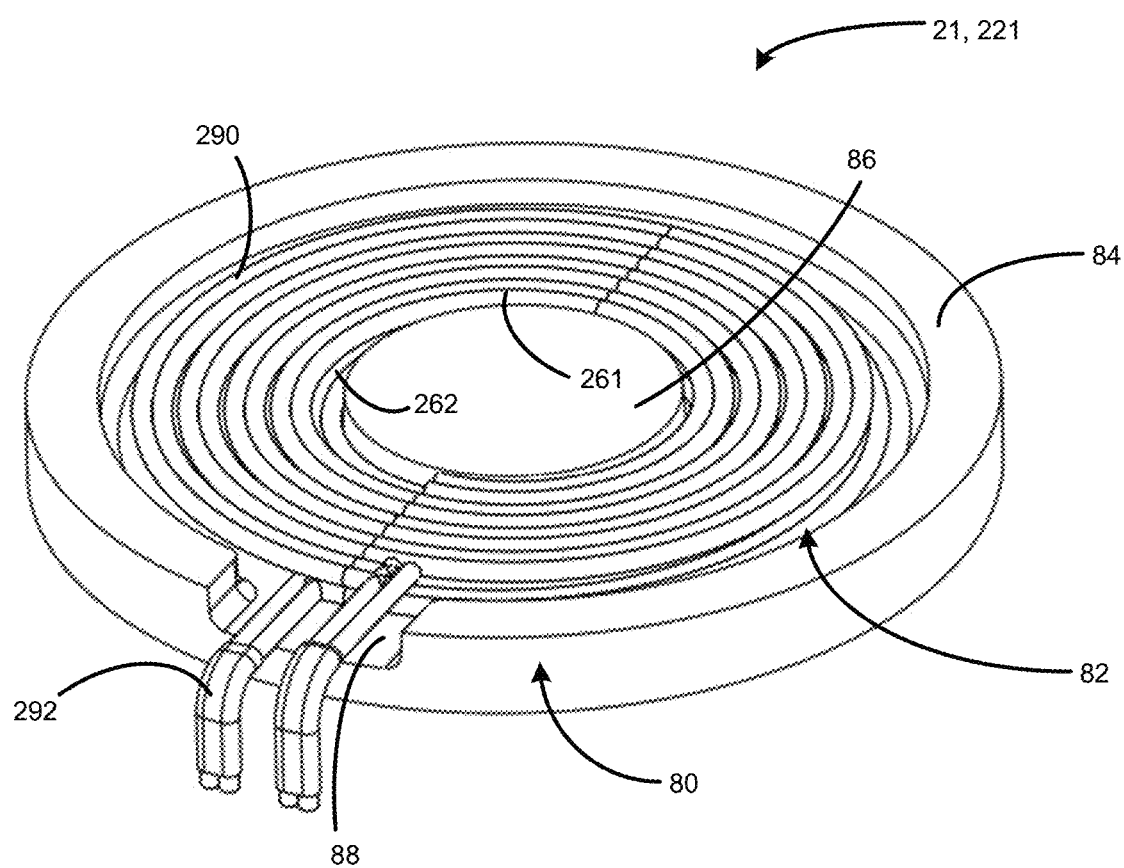
FIG. 12A is a perspective view of the transmitter coil of FIGS. 1-11 and the shielding of FIGS. 10 and 11, in accordance with FIGS. 1-11 and the present disclosure.
Figure 12B:
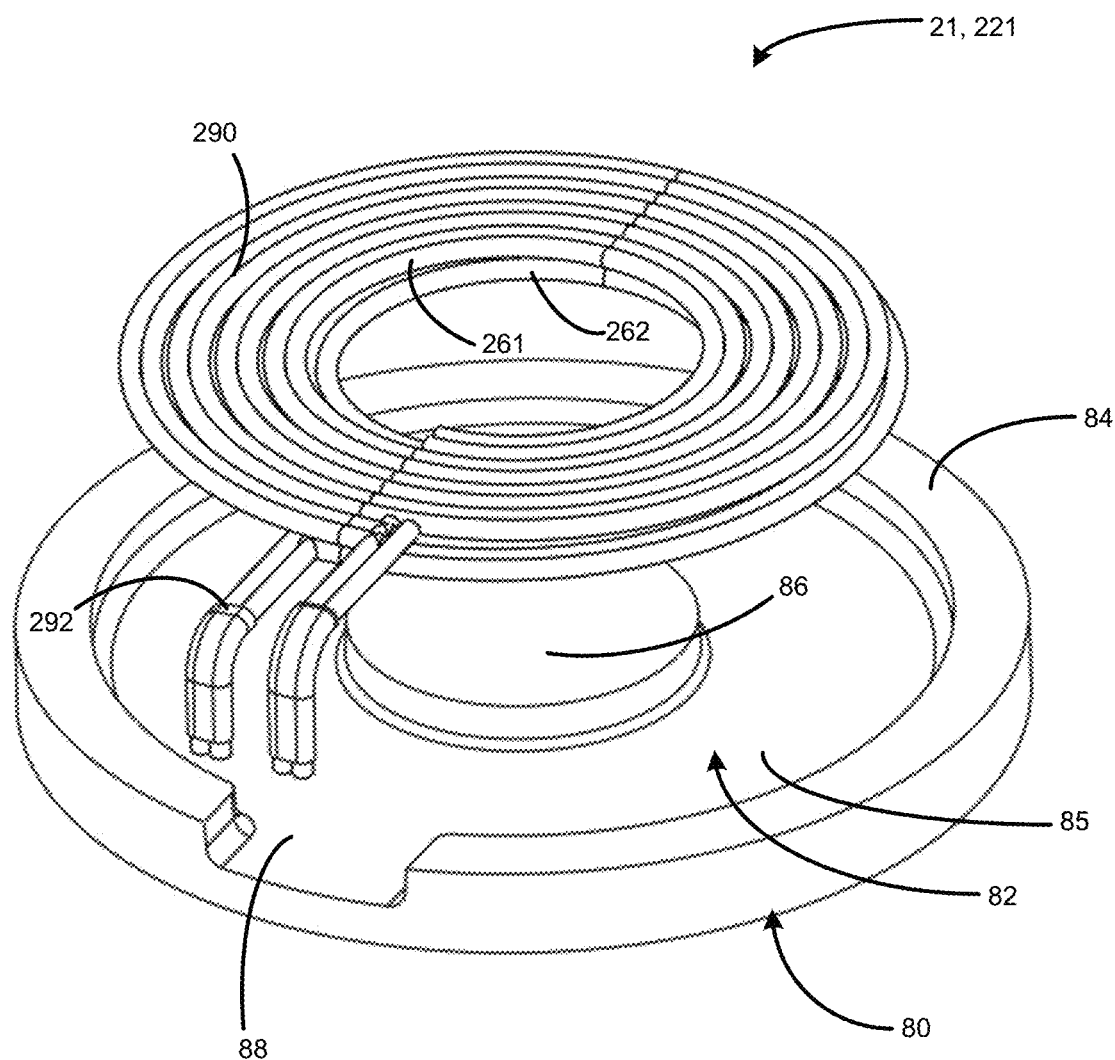
FIG. 12B is an exploded perspective view of the transmitter coil of FIGS. 1-10 and the shielding of FIGS. 10 and 11, in accordance with FIGS. 1-12A and the present disclosure.

In another embodiment, the shielding 80 may surround less than the entire bottom section of the transmitter antenna 21. For example, connecting wires (e.g., connecting wires 292, as best illustrated in FIGS. 12A, 12B and discussed below) may be run through an opening in the bottom of the shielding 80.

In an embodiment, as shown in FIG. 10, the shielding 80 is an "E-Core" type shielding, wherein the cavity 82 and structural elements of the shielding 80 are configured in an E-shape configuration, when the shielding is viewed, cross-sectionally, in a side view. The E-Core configuration is further illustrated in FIG. 11, which is a perspective view of the shielding 80. The shielding 80 may include a magnetic core 86, a magnetic backing 85, and a magnetic ring 84. The magnetic core 86 is spaced inwardly from the outer edge of the magnetic backing 85 and projects in an upward direction from the top surface of the magnetic backing 85. The magnetic core 86 and the magnetic ring 84 function to surround the transmitter coil 21 and to direct and focus magnetic fields, hence improving coupling with the receiver coil 31 of the power receiver 30.

In addition to covering the entire outer diameter of the transmitter coil 21, the shielding 80 may also cover the inner diameter di of the transmitter coil 21. That is, as shown, the inner section of the E-Core configuration may protrude upward through the middle of the transmitter coil 21.

In an embodiment, the cavity 82 is configured such that the shielding 80 covers the entire bottom section of the transmitter coil 21 and the entire side sections of the transmitter coil 21. The top section of the transmitter coil 21 is not covered. The bottom section of the transmitter coil 21 is the side of the transmitter coil 21 that is opposite of the direction of the primary power transfer to the receiver coil. With a wire wound transmitter coil 21, the side section of the transmitter coil 21 includes the side section of the outer most winding of the coil 21.

FIG. 12A is a perspective view of the transmitter coil 21 and the embodiment of the E-core shielding of FIG. 11 and FIG. 12B is an exploded perspective view of the transmitter coil 21 and the embodiment of the E-core shielding of FIG. 11. The transmitter coil 21 is positioned above the shielding 80, whose combination of structural bodies, as discussed above, may include the combination of the magnetic core 86, the magnetic backing 85, and magnetic ring 84. This magnetic shielding combination functions to help direct and concentrate magnetic fields created by transmitter coil 21 and can also limit side effects that would otherwise be caused by magnetic flux passing through nearby metal objects. In some examples, the magnetic ring defines an opening 88, in which a connecting wire 292 of the transmitter coil 21 can exit the shielding 80.

As defined herein, a "shielding material," from which the shielding 80 is formed, is a material that captures a magnetic field. An example of which is a ferrite material. The ferrite shield material selected for the shielding 80 also depends on the operating frequency, as the complex magnetic permeability ($\mu=\mu'-j*\mu''$) is frequency dependent. The material may be a sintered flexible ferrite sheet or a rigid shield and be composed of varying material compositions. In some examples, the ferrite material for the shielding 80 may include a Ni—Zn ferrite, a Mn—Zn ferrite, and any combinations thereof.

Returning now to FIG. 10 and with continued reference to FIGS. 11 and 12, the shielding 80 is aligned with the transmitter antenna 21 such that the shielding 80 substantially surrounds the transmitter antenna 21 on all sides, aside from the top face 60. In other words, the transmitter antenna 21 may be wound around the magnetic core 86 and be surrounded, on the bottom and sides, respectively, by the magnetic backing 85 and the magnetic ring 84. As illustrated, the shielding 80, in the form of one or both of the magnetic backing and the magnetic core, may extend beyond the outer diameter do of the transmitter antenna 21 by a shielding extending distance de. In some examples, the shielding extending distance de may be in a range of about 5 mm to about 6 mm. The shielding 80, at the magnetic backing 85, and the transmitter coil 21 are separated from one another by a separation distance ds, as illustrated. In some examples, the separation distance ds may be in a range of about 0.1 mm and 0.5 mm.

An interface surface 70 of the base station 11 is located at an interface gap distance dint from the transmitter coil 21 and the shielding 80. The interface surface 70 is a surface on the base station 11 that is configured such that when a power receiver 30 is proximate to the interface surface 70, the power receiver 30 is capable of coupling with the power transmitter 20, via near-field magnetic induction between the transmitter antenna 21 and the receiver antenna 31, for the purposes of wireless power transfer. In some examples, the interface gap distance dint maybe in a range of about 8 mm to about 10 mm. In such examples, the dint is greater than the standard required Z-distance for Qi™ certified wireless power transmission (3-5 mm). Accordingly, by having a greater dint, empty space and/or an insulator can be positioned between the transmission coil 21 and the interface surface 70 to mitigate heat transfer to the interface surface 70, the power receiver 30, and/or the electronic device 14 during operation. Further, such a greater dint allows for interface design structures in which objects on or attached to the electronic device 14 may remain attached to the electronic device during operation. As described in greater detail below, design features of the interface surface 70 may be included for interaction with such objects for aligning the power transmitter 20 and the power receiver 30 for operation.

Returning now to FIG. 12B, an exemplary coil 221 for use as the transmitter antenna 21 is illustrated in the exploded view of the transmitter antenna 21 and shielding 80. The coil 221 includes one or more bifilar Litz wires 290 for the first bifilar coil layer 261 and the second bifilar coil layer 262. "Bifilar," as defined herein, refers to a wire having two closely spaced, parallel threads and/or wires. Each of the first and second bifilar coil layers 261, 262 include N number of turns. In some examples, each of the first and second bifilar coil layers 261, 262 include about 4.5 turns and/or the bifilar coil layers 261, 262 may include a number of turns in a range of about 4 to about 5. In some examples, the one or more bifilar Litz wire 290 may be no. 17 AWG (1.15 mm) type 2 Litz wire, having 105 strands of no. 40 AWG (0.08 mm diameter), or equivalent wire. Utilization of multiple layers, thick Litz wire, bifilar Litz wire, and any combinations thereof, may result in the coil 21 achieving greater Q and/or may result in increases in gap 17 height and/or Z-distance between the coil 21 and a receiver coil.

Figure 13A:
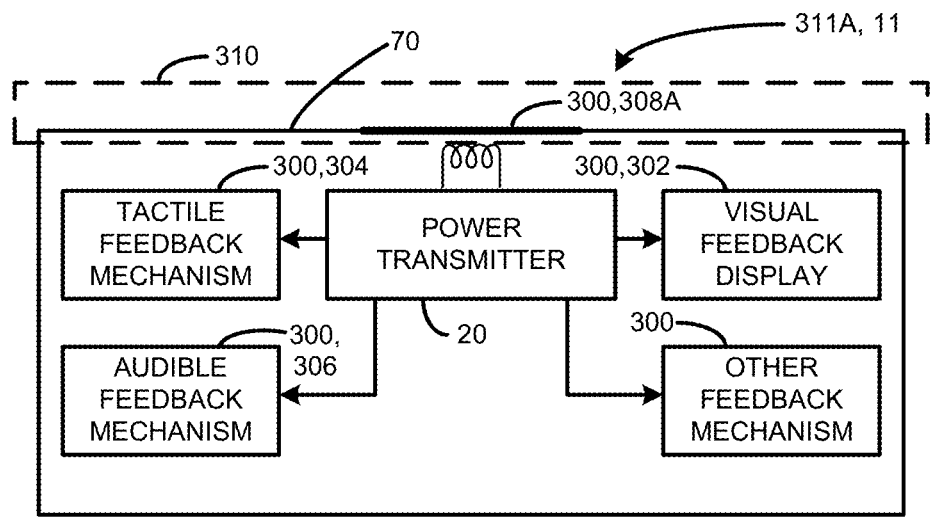
FIG. 13A is an exemplary block diagram for an embodiment of the base station of FIGS. 1-10 in accordance with FIGS. 1-12 and the present disclosure.

FIG. 13A is a first block diagram 311A for an implementation of the base station 11. As illustrated, the power transmitter 20 is contained within the base station 11. In some examples, the base station 11 includes one or more user feedback mechanisms 300, wherein each of the one or more user feedback mechanisms 300 are configured for aiding a user in aligning a power receiver 30 and/or its associated electronic device 14 with an active area 310 for wireless power transmission via the transmitter coil 21, wherein the power receiver 30 is configured to acquire near field inductive power from the transmitter coil 21. The "active area" 310, as defined herein, refers to any area, volume, and/or space proximate to the interface surface 70 wherein the power transmitter 20 is capable of transmitting near field inductive power to a power receiver 30.

The one or more user feedback mechanisms 300 may include one or more of a visual feedback display 302, a tactile feedback mechanism 304, an audible feedback mechanism 306, a marking 308 on the interface surface 70, any other feedback mechanisms 300, and any combinations thereof. The visual feedback display 302 is configured for visually indicating proper alignment of the power receiver 30 with the active area 310. The visual feedback display 302 may include, but is not limited to including, a visual screen, a light, a light emitting diode (LED), a liquid crystal display (LCD) display, other visual displays, and/or any combinations thereof. The tactile feedback mechanism 304 is configured for tactilely indicating if the power receiver 30 is in proper alignment with the active area 310. The tactile feedback mechanism 304 may include, but is not limited to including, a haptic feedback device, a vibrating device, other tactile feedback mechanisms, and any combinations thereof. The audible feedback device 306 is configured for audibly indicating if the power receiver 30 is in proper alignment with the active area 310. The audio feedback mechanism 306 may include, but is not limited to including, a speaker, a sound generator, a voice generator, an audio circuit, an amplifier, other audible feedback devices, and any combinations thereof.

The marking 308 may be any visual and/or mechanical signifier, indicating where a user of the electronic device 14 should place his/her/their electronic device 14 on the interface surface 70, such that the power transmitter 20 will be in proper alignment with the power receiver 30 of the electronic device 14. Additionally or alternatively, the marking 308 may indicate a location of the active area 310 and/or a proper location within the active area 310. In the exemplary embodiment of the diagram 311A, the marking 308A may be a substantially two-dimensional visual indicator marked on the interface surface 70. The substantially two-dimensional marking 308A may include, but is not limited to including, a printed indicator, a logo, a message indicating a user should place the electronic device 14 upon the marking 308A, any other substantially two-dimensional markings, and any combinations thereof.

Figure 13B:
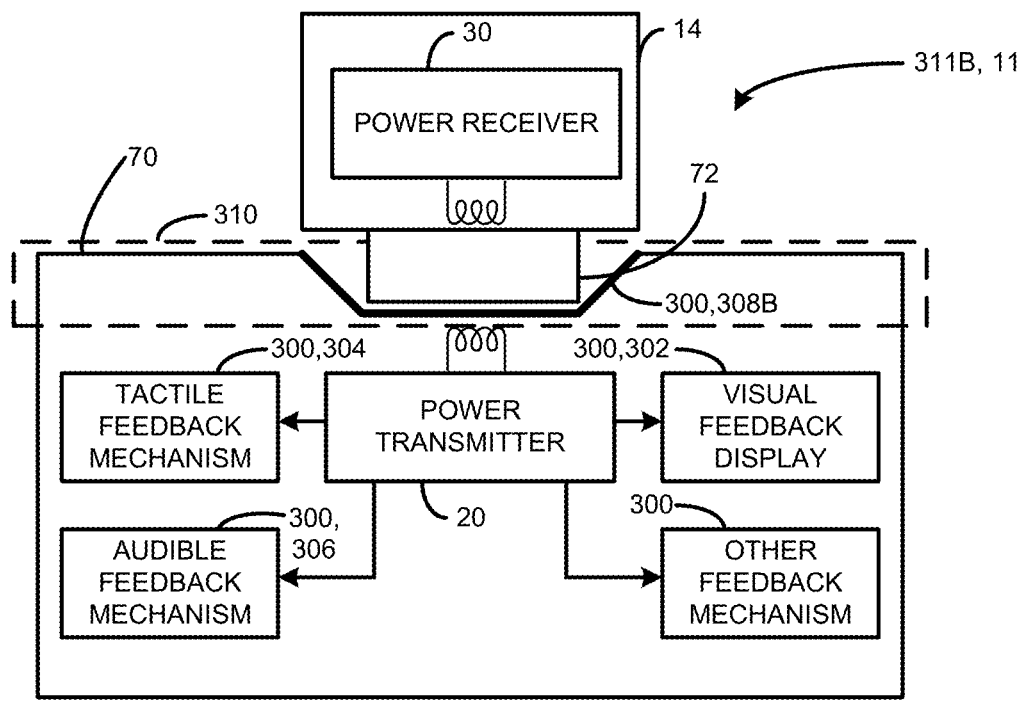
FIG. 13B is an exemplary block diagram for another embodiment of the base station of FIGS. 1-10 in accordance with FIGS. 1-12 and the present disclosure.

In an alternative embodiment in a second schematic block diagram 311B illustrated in FIG. 13B, the marking 308B is a substantially three-dimensional and/or mechanical marking 308B, such as, but not limited to, an indentation and/or notch in the interface surface 70. The three-dimensional marking 308B may be configured to interact with mechanical feature 72 of the electronic device 14. The mechanical feature 72 may be any mechanical feature of the electronic device 14 and/or another connected mechanical feature and/or device associated with the electronic device 14. Accordingly, interaction between the mechanical feature 72 and the three-dimensional marking 308B may be configured to align the power transmitter 20 with the power receiver 30 of the electronic device 14. For example, the mechanical feature 72 may be an external protrusion located relatively proximate to the power receiver 30 of electronic device 14 and the marking 308B is configured to receive the mechanical feature and, by the nature of such receipt, the power transmitter 20 and the power receiver 30 are properly aligned for near-field inductive wireless power transfer. In some such examples, the electronic device 14 is a mobile device, such as a smart phone and/or tablet computing device, and the mechanical feature 72 may be an externally attached grip device configured for gripping the electronic device 14 when in use. In such examples, the marking 308B is configured to receive the grip device mechanical feature 72 and enable proper alignment of the power transmitter 20 and the power receiver 30 for near-field inductive wireless power transfer while the removable mechanical feature 72 remains attached to the electronic device 14.

Figure 14:
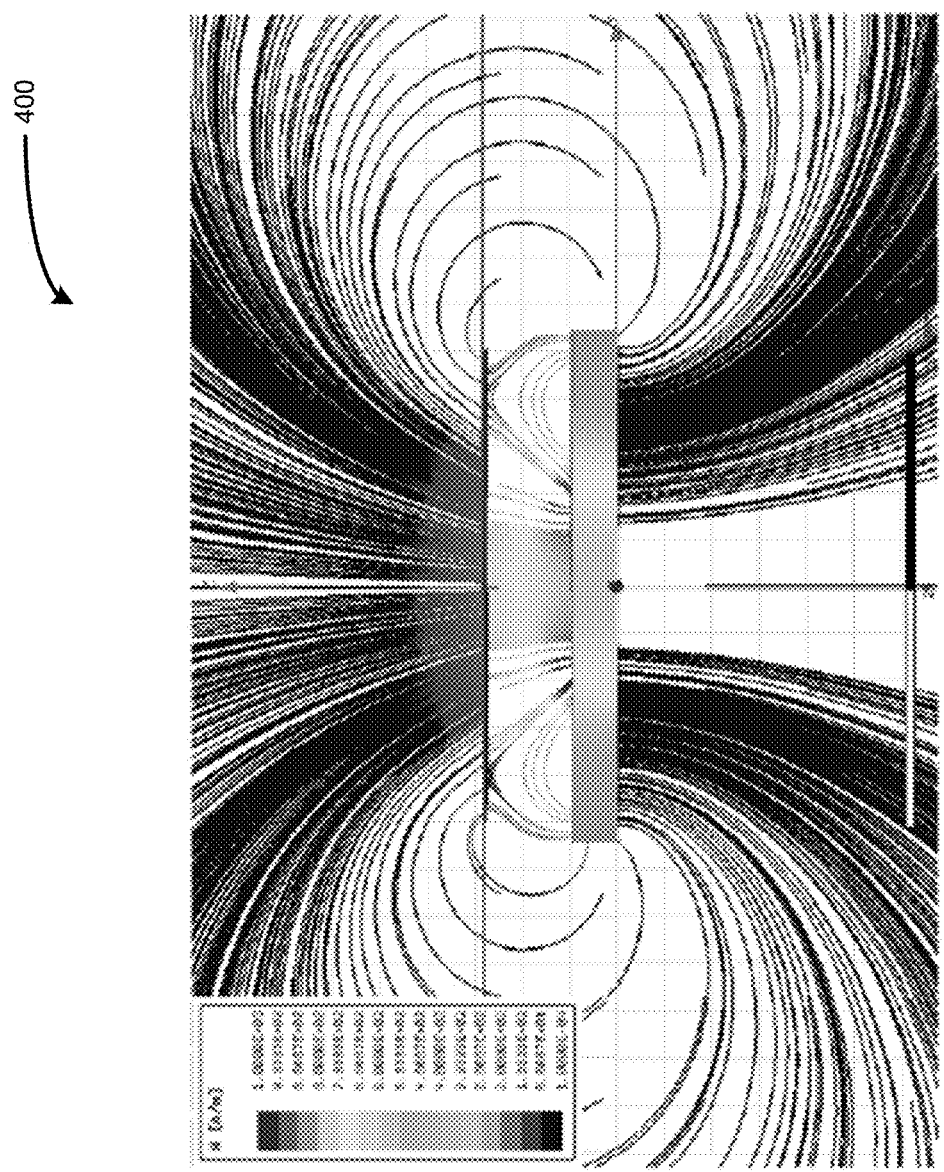
FIG. 14 is a readout of an actual simulation of magnetic fields generated by the coils and/or transmitters illustrated in FIGS. 1-13 and disclosed herein.

FIG. 14 is an exemplary, actual, simulation 400 of a magnetic field generated by a transmitter coil 21 and/or its associated power transmitter 20 and captured by an exemplary receiver coil 31 and/or its associated power receiver 30, when the transmitter coil 21 and/or power transmitter 20 are designed, manufactured, and/or implemented according to the teachings of this disclosure. The receiver coil 31 was as a standard Qi™ receiver coil utilized by commercial electronic devices, such as mobile phones, and the receiver coil 31 was modelled with a metal piece behind the coil, wherein the metal piece was used to simulate a battery. The simulation shows that the magnetic field generated by the transmitter coil 20 was captured by the receiver coil 31 at an extended Z-distance of 9 mm. As discussed previously, Qi™ wireless transmitter coils typically operate between coil-to-coil distances of about 3 mm to about 5 mm. The shaped-magnetics of the transmitter coil 21 have shown to favorably reshape a magnetic field so that coil-to-coil coupling can occur at extended Z-distances, wherein the Z-distances are extended about 2 times to about 5 times the distance of standard Qi™ wireless power transmitters. Furthermore, the shaped-magnetics of the present application can extend coupling of present day a Qi™ wireless power transmitter at a Z-distance ranging about 5 mm to about 25 mm. Any of the E-core and/or additional or alternative custom shapes for the shielding 80, may successfully be used to reshape the magnetic field for extended Z-distance coupling by a minimum of a 5% compared to standard present-day power transmitters. In addition, any of the E-core and custom shapes previously discussed, each in conjunction with its relation to a coil to the magnetic has also may further increase z-direction coupling by at least another 5%. An embodiment comprising a structure, the structure comprising a coil and a magnetic material, wherein a gap between the coil and the magnetic material residing at the inner diameter of the coil comprises 2 mm, reshapes the magnetic field so that coupling increases by 5%.

As is discussed above, the transmitter coils 21, power transmitters 20, and/or base stations 11, disclosed herein, may achieve great advancements in Z-distance and/or gap 17 height, when compared to legacy, low-frequency (e.g., in a range of about 87 kHz to about 205 kHz) transmission coils, power transmitters, and/or base stations. To that end, an extended Z-distance not only expands a linear distance, within which a receiver may be placed and properly coupled with a transmitter, but an extended Z-distance expands a three-dimensional charging and/or operational volume ("charge volume"), within which a receiver may receive wireless power signals from a transmitter. For the following example, the discussion fixes lateral spatial freedom (X and Y distances) for the receiver coil, positioned relative to the transmitter coil, as a control variable. Accordingly, for discussion purposes only, one assumes that the X and Y distances for the base stations 11, power transmitters 20, and/or transmitter coils 21 are substantially similar to the X and Y distances for the legacy system(s). However, it is certainly contemplated that the inventions disclosed herein may increase one or both of the X-distance and Y-distance. Furthermore, while the instant example uses the exemplary range of 8-10 mm for the Z-distance of the base stations 11, power transmitters 20, and/or transmitter coils 21, it is certainly contemplated and experimental results have shown that the base stations 11, power transmitters 20, and/or transmitter coils 21 are certainly capable of achieving Z-distances having a greater length than about 10 mm, such as, but not limited to, up to 15 mm and/or up to 30 mm. Accordingly, the following table is merely exemplary and for illustration that the expanded Z-distances, achieved by the base stations 11, power transmitters 20, and/or transmitter coils 21, have noticeable, useful, and beneficial impact on a charge volume associated with one or more of the base stations 11, power transmitters 20, and/or transmitter coils 21.

| Spatial Freedom Comparison | | | | | |
|---|---|---|---|---|---|
| | X-dist | Y-dist | Z-dist (min) | Z-dist (max) | Charge Vol. (min) | Charge Vol. (max) |
| Legacy | 5 mm | 5 mm | 3 mm | 5 mm | 75 mm$^3$ | 125 mm$^3$ |
| 11, 20, 21 (8-10 mm. ver.) | 5 mm | 5 mm | 8 mm | 10 mm | 200 mm$^3$ | 250 mm$^3$ |

-continued

Spatial Freedom Comparison

| | X-dist | Y-dist | Z-dist (min) | Z-dist (max) | Charge Vol. (min) | Charge Vol. (max) |
|---|---|---|---|---|---|---|
| 11, 20, 21 (15 mm. ver.) | 5 mm | 5 mm | 10 mm | 15 mm | 250 mm$^3$ | 375 mm$^3$ |
| 11, 20, 21 (30 mm. ver.) | 5 mm | 5 mm | 15 mm | 30 mm | 375 mm$^3$ | 750 mm$^3$ |

Thus, by utilizing the base stations 11, power transmitters 20, and/or transmitter coils 21, the effective charge volume may increase by more than 100 percent, when compared to legacy, low-frequency wireless power transmitters. Accordingly, the base stations 11, power transmitters 20, and/or transmitter coils 21 may achieve large Z-distances, gap heights, and/or charge volumes that were not possible with legacy low frequency, but thought only possible in lower power, high frequency (e.g., above about 2 Mhz) wireless power transfer systems.

Figures 15, 16:
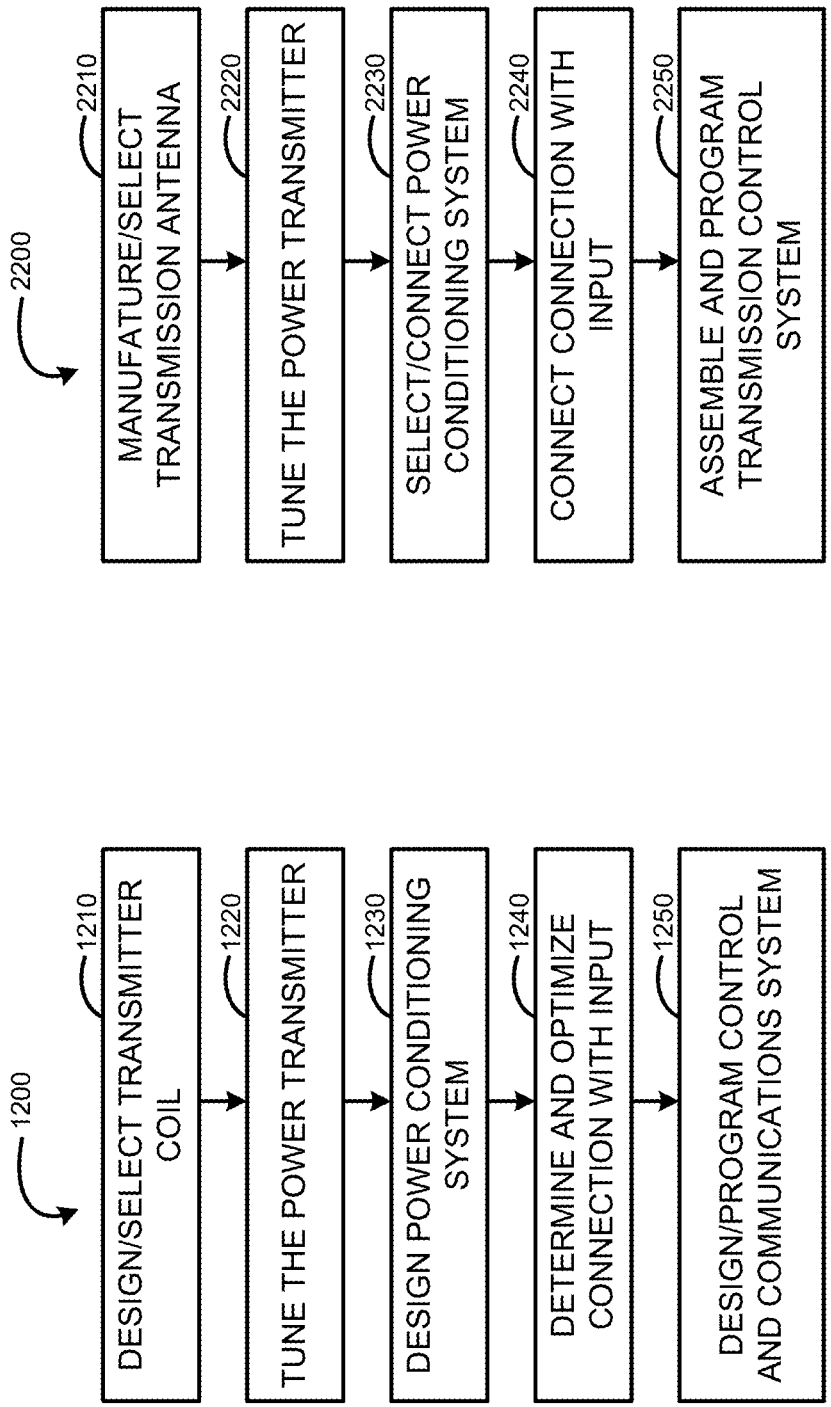
FIG. 15 is a flow chart for an exemplary method for designing a power transmitter, in accordance with FIGS. 1-14 and the present disclosure.
FIG. 16 is a flow chart for an exemplary method for manufacturing a power transmitter, in accordance with FIGS. 1-14 and the present disclosure.

FIG. 15 is an example block diagram for a method 1200 for designing the power transmitter 20. The method 1200 includes designing and/or selecting the transmitter coil 21 for the power transmitter 20, as illustrated in block 1210. The method 1200 includes tuning the power transmitter 20, as illustrated in block 1220. Such tuning may be utilized for, but not limited to being utilized for, impedance matching.

The method 1200 further includes designing the power conditioning system 40 for the power transmitter 20, as illustrated in block 1230. The power conditioning system 40 may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 1240, the method 1200 may determine and optimize a connection, and any associated connection components, to configure and/or optimize a connection between the input power source 12 and the power conditioning system 40 of block 1230. Such determining, configuring, and/or optimizing may include selecting and implementing protection mechanisms and/or apparatus, selecting and/or implementing voltage protection mechanisms, among other things.

The method 1200 further includes designing and/or programing the control and communications system 26 of the power transmitter 20, as illustrated in block 1250. Components of such designs include, but are not limited to including, the sensing system 50, the driver 48, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

FIG. 16 is an example block diagram for a method 2200 for manufacturing the power transmitter 20. The method 2200 includes manufacturing and/or selecting the transmitter coil 21 for the power transmitter 20, as illustrated in block 2210. The method 2200 includes tuning the power transmitter 20, as illustrated in block 2220. Such tuning may be utilized for, but not limited to being utilized for, impedance matching.

The method 2200 further includes manufacturing the power conditioning system 40 for the power transmitter 20, as illustrated in block 2230. The power conditioning system 40 may be designed and/or manufactured with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. Further, at block 2240, the method 2200 may include connecting and/or optimizing a connection, and any associated connection components, to configure and/or optimize a connection between the input power source 12 and the power conditioning system 40 of block 2230. Such determining, manufacturing, configuring, and/or optimizing may include selecting and implementing protection mechanisms and/or apparatus, selecting and/or implementing voltage protection mechanisms, among other things.

The method 2200 further includes designing and/or programing the control and communications system 26 of the power transmitter 20, as illustrated in block 2250. Components of such designs include, but are not limited to including, the sensing system 50, the driver 48, the transmission controller 28, the memory 27, the communications system 29, the thermal sensing system 52, the object sensing system 54, the receiver sensing system 56, the electrical sensor(s) 57, the other sensor(s) 58, in whole or in part and, optionally, including any components thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A wireless power transmitter comprising:
    a power-supply interface that is operable to receive, from an external power supply, a supply voltage signal having a configurable voltage level;
    a power conditioning system that is operable to (i) receive the supply voltage signal having the configurable voltage level, (ii) receive a drive signal having a configurable frequency, and (iii) based on the supply voltage signal and the drive signal, produce an alternating current ("AC") signal having the configurable frequency and a configurable power level that corresponds to the configurable voltage level of the supply voltage signal, wherein the power conditioning system comprises an inverter;
    a capacitor circuit that is operable to (i) receive the AC signal that is produced by the power conditioning system comprising the inverter and (ii) tune the AC signal;
    a transmission antenna that is operable to produce a wireless power signal for receipt by at least one receiver antenna of at least one wireless power receiver in accordance with the AC signal that is produced by the power conditioning system comprising the inverter and tuned by the capacitor circuit; and
    at least one controller comprising:
        at least one processor;
        at least one non-transitory machine-readable medium; and
        executable code stored on the at least one non-transitory machine-readable medium that, when executed by the at least one processor, causes the at least one controller to:
            send, to the external power supply, a request that the external power supply change the configurable voltage level of the supply voltage signal from a first voltage level to a second voltage level;
            detect that the external power supply has changed the configurable voltage level of the supply voltage signal from the first voltage level to the second voltage level; and
            after detecting that the external power supply has changed the configurable voltage level of the supply voltage signal from the first voltage level to the second voltage level, cause the configurable frequency of the drive signal to be changed from a first frequency to a second frequency.

2. The wireless power transmitter of claim 1, wherein the at least one controller further comprises executable code stored on the at least one non-transitory machine-readable medium that, when executed by the at least one processor, causes the at least one controller to:
    produce the drive signal having the configurable frequency; and
    provide the drive signal having the configurable frequency as input to the power conditioning system.

3. The wireless power transmitter of claim 1, further comprising:
    a driver that is configured to (i) produce the drive signal having the configurable frequency in accordance with a control signal received from the at least one controller; and
    provide the drive signal having the configurable frequency as input to the power conditioning system.

4. The wireless power transmitter of claim 1, wherein the second voltage level is higher than the first voltage level.

5. The wireless power transmitter of claim 1, wherein the second frequency is higher than the first frequency.

6. The wireless power transmitter of claim 1, wherein at least the first frequency is within a range of about 87 kilohertz ("KHz") to about 205 kHz.

7. The wireless power transmitter of claim 1, wherein the external power supply comprises one or both of (i) a voltage regulator or (ii) a power-supply controller.

8. The wireless power transmitter of claim 1, wherein the executable code stored on the at least one non-transitory machine-readable medium that, when executed by the at least one processor, causes the at least one controller to send the request that the external power supply change the configurable voltage level of the supply voltage signal from the first voltage level to the second voltage level comprises executable code stored on the at least one non-transitory machine-readable medium that, when executed by the at least one processor, causes the at least one controller to:
send the request that the external power supply change the configurable voltage level of the supply voltage signal from the first voltage level to the second voltage level after detecting a presence of a given wireless power receiver.

9. The wireless power transmitter of claim 1, wherein the executable code stored on the at least one non-transitory machine-readable medium that, when executed by the at least one processor, causes the at least one controller to send the request that the external power supply change the configurable voltage level of the supply voltage signal from the first voltage level to the second voltage level comprises executable code stored on the at least one non-transitory machine-readable medium that, when executed by the at least one processor, causes the at least one controller to:
send the request that the external power supply change the configurable voltage level of the supply voltage signal from the first voltage level to the second voltage level based on receiving a signal from a given wireless power receiver.

10. The wireless power transmitter of claim 9, wherein the signal from the given wireless power received comprises an indication of a given power level that is desired by the given wireless power receiver.

11. The wireless power transmitter of claim 1, wherein the executable code stored on the at least one non-transitory machine-readable medium that, when executed by the at least one processor, causes the at least one controller to cause the configurable frequency of the drive signal to be changed from the first frequency to the second frequency comprises executable code stored on the at least one non-transitory machine-readable medium that, when executed by the at least one processor, causes the at least one controller to:
cause the configurable frequency of the drive signal to be changed from the first frequency to the second frequency based on a change in power requirements for the wireless power transmitter.

12. The wireless power transmitter of claim 1, wherein the executable code stored on the at least one non-transitory machine-readable medium that, when executed by the at least one processor, causes the at least one controller to cause the configurable frequency of the drive signal to be changed from the first frequency to the second frequency comprises executable code stored on the at least one non-transitory machine-readable medium that, when executed by the at least one processor, causes the at least one controller to:
cause the configurable frequency of the drive signal to be changed from the first frequency to the second frequency based on receiving a signal from a given wireless power receiver.

13. The wireless power transmitter of claim 1, wherein the drive signal comprises a pulse width modulation ("PWM") signal.

14. The wireless power transmitter of claim 1, wherein the configurable voltage level is selected from a group of voltage levels that includes 5 volts, 9 volts, and 15 volts.

15. The wireless power transmitter of claim 1, wherein the capacitor circuit comprises a capacitance in a range of about 400 nanofarads ("nF") to about 450 nF.

16. The wireless power transmitter of claim 1, wherein the inverter comprises a full-bridge inverter.

17. The wireless power transmitter of claim 1, wherein the power conditioning system does not include a voltage regulator, and wherein the supply voltage signal having the configurable voltage level is passed to the inverter without being conditioned by any voltage regulator that is internal to the wireless power transmitter.

18. The wireless power transmitter of claim 1, wherein the inverter is configured to receive an input voltage signal having a configurable inverter input voltage level that is in a range between 5 volts and 20 volts, and wherein the configurable inverter input voltage level is based on the configurable voltage level of the supply voltage signal.

19. A wireless power transmitter comprising:
a power-supply interface that is operable to receive, from an external power supply, a supply voltage signal having a configurable voltage level;
a power conditioning system that is operable to (i) receive the supply voltage signal having the configurable voltage level, (ii) receive a drive signal having a configurable frequency, and (iii) based on the supply voltage signal and the drive signal, produce an alternating current ("AC") signal having the configurable frequency and a configurable power level that corresponds to the configurable voltage level of the supply voltage signal, wherein the power conditioning system comprises an inverter;
a driver that is configured to (i) produce the drive signal having the configurable frequency and (ii) provide the drive signal having the configurable frequency as input to the power conditioning system comprising the inverter;
a capacitor circuit that is operable to (i) receive the AC signal that is produced by the power conditioning system comprising the inverter and (ii) tune the AC signal;
a transmission antenna that is operable to produce a wireless power signal for receipt by at least one receiver antenna of at least one wireless power receiver in accordance with the AC signal that is produced by the power conditioning system comprising the inverter and tuned by the capacitor circuit; and
at least one controller comprising:
at least one processor;
at least one non-transitory machine-readable medium; and
executable code stored on the at least one non-transitory machine-readable medium that, when executed by the at least one processor, causes the at least one controller to:
send, to the external power supply, a request that the external power supply change the configurable voltage level of the supply voltage signal from a first voltage level to a second voltage level;
detect that the external power supply has changed the configurable voltage level of the supply voltage signal from the first voltage level to the second voltage level; and
after detecting that the external power supply has changed the configurable voltage level of the supply voltage signal from the first voltage level to the second voltage level, cause the configurable frequency of the drive signal to be changed from a first frequency to a second frequency by sending a drive-control signal to the driver that instructs the driver to change the configurable frequency of the drive signal from the first frequency to the second frequency.

20. The wireless power transmitter of claim 19, wherein the configurable voltage level is selected from a group of voltage levels that includes 5 volts, 9 volts, and 15 volts.

21. The wireless power transmitter of claim 19, wherein the inverter is configured to receive an input voltage signal having a configurable inverter input voltage level that is in a range between 5 volts and 20 volts, and wherein the configurable inverter input voltage level is based on the configurable voltage level of the supply voltage signal.

22. The wireless power transmitter of claim 19, wherein the second voltage level is higher than the first voltage level.

23. The wireless power transmitter of claim 19, wherein the second frequency is higher than the first frequency.

24. The wireless power transmitter of claim 19, wherein at least the first frequency is within a range of about 87 kilohertz ("kHz") to about 205 kHz.

25. The wireless power transmitter of claim 19, wherein the executable code stored on the at least one non-transitory machine-readable medium that, when executed by the at least one processor, causes the at least one controller to send the request that the external power supply change the configurable voltage level of the supply voltage signal from the first voltage level to the second voltage level comprises executable code stored on the at least one non-transitory machine-readable medium that, when executed by the at least one processor, causes the at least one controller to:
send the request that the external power supply change the configurable voltage level of the supply voltage signal from the first voltage level to the second voltage level based on receiving a signal from a given wireless power receiver.

26. The wireless power transmitter of claim 19, wherein the power conditioning system does not include a voltage regulator, and wherein the supply voltage signal having the configurable voltage level is passed to the inverter without being conditioned by any voltage regulator that is internal to the wireless power transmitter.

27. A method of operating a wireless power transmitter comprising (i) a power-supply interface through which the wireless power transmitter receives a supply voltage signal having a configurable voltage level from an external power supply, (ii) a power conditioning system comprising an inverter, (iii) a capacitor circuit, and (iv) a transmission antenna, the method comprising:

sending, to the external power supply, a request that the external power supply change a configurable voltage level of the supply voltage signal from a first voltage level to a second voltage level;
receiving, via the power supply interface from an external power supply, the supply voltage signal having the second voltage level;
after detecting that the external power supply has changed the configurable voltage level of the supply voltage signal from the first voltage level to the second voltage level, causing a configurable frequency of a drive signal to be changed from a first frequency to a second frequency;
providing, to the power conditioning system comprising the inverter, the drive signal having the second frequency and the supply voltage signal having the second voltage level, wherein the power conditioning system functions to (i) receive the drive signal having the second frequency, (ii) receive the supply voltage signal having the second voltage level, and (iii) based on the drive signal and the supply voltage signal produce an alternating current ("AC") signal having the second frequency and a configurable power level that corresponds to the second voltage level of the supply voltage signal;
providing, to the capacitor circuit, the AC signal, wherein the capacitor circuit functions to (i) receive the AC signal, (ii) tune the AC signal; and
providing the AC signal to the transmission antenna, wherein the transmission antenna functions to (i) receive the AC signal, and (ii) produce a wireless power signal for receipt by at least one receiver antenna of at least one wireless power receiver in accordance with the AC signal that is produced by the power conditioning system and tuned by the capacitor circuit.

28. The method of claim 27, wherein sending, to the external power supply, the request that the external power supply change the configurable voltage level of the supply voltage signal from the first voltage level to the second voltage level comprises:
sending the request that the external power supply change the configurable voltage level of the supply voltage signal from the first voltage level to the second voltage level based on receiving a signal from a given wireless power receiver.

29. The method of claim 27, wherein causing the configurable frequency of the drive signal to be changed from the first frequency to the second frequency comprises:
causing the configurable frequency of the drive signal to be changed from the first frequency to the second frequency based on receiving a signal from a given wireless power receiver.

30. The method of claim 27, wherein the power conditioning system does not include a voltage regulator, and wherein the supply voltage signal having the configurable voltage level is passed to the power conditioning system comprising the inverter without being conditioned by any voltage regulator that is internal to the wireless power transmitter.

* * * * *